United States Patent
Marinelli

(10) Patent No.: US 11,182,530 B1
(45) Date of Patent: Nov. 23, 2021

(54) AUTOMATIC ROUTING SYSTEM WORKFLOW

(71) Applicant: Dialog Semiconductor (UK) Limited, London (GB)

(72) Inventor: Giuliano Fernandes Marinelli, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/087,688

(22) Filed: Nov. 3, 2020

(51) Int. Cl.
*G06F 30/00* (2020.01)
*G06F 30/3947* (2020.01)
*G06F 30/392* (2020.01)
*G06F 30/39* (2020.01)
*G06F 30/3953* (2020.01)
*G06F 119/12* (2020.01)
*H01L 23/528* (2006.01)

(52) U.S. Cl.
CPC .......... *G06F 30/3947* (2020.01); *G06F 30/39* (2020.01); *G06F 30/392* (2020.01); *G06F 30/3953* (2020.01); *G06F 2119/12* (2020.01); *H01L 23/528* (2013.01)

(58) Field of Classification Search
CPC .. G06F 30/3947; G06F 30/3953; G06F 30/39; G06F 30/392; G06F 2119/12; H01L 23/528
See application file for complete search history.

(56) References Cited

U.S. PATENT DOCUMENTS

| 5,999,911 A | 12/1999 | Berg et al. |
| 8,286,118 B2 | 10/2012 | McElvain |
| 8,443,329 B2 * | 5/2013 | McConaghy ........... G06F 30/36 716/136 |

(Continued)

FOREIGN PATENT DOCUMENTS

| WO | 2016137397 A2 | 9/2016 |
| WO | 2020086053 A1 | 4/2020 |

OTHER PUBLICATIONS

"Hierarchical Physical Design System," by Uwe Schulz, Proceedings. VLSI and Computer Peripherals COMPEURO 89, May 8-12, 1989, 5 pgs.

(Continued)

*Primary Examiner* — Naum Levin
(74) *Attorney, Agent, or Firm* — Saile Ackerman LLC; Stephen B. Ackerman; Billy Knowles

(57) ABSTRACT

A computer-implementable method, a computing system, and a non-transitory computer-readable medium for automating workflow for routing metal wiring structures on an integrated circuit. The method automates, monitors, and controls all tasks for an auto-routing workflow. The method retrieves the auto-routing rules definition from a centrally stored location for easy maintenance. The method allows entry of wiring auto-routing constraints. The method enables customization per the design application to control signal integrity affected by the intrinsic routing metallization parasitic. The virtual copy of the layout database allows the layout database preparation without modifying the actual project layout. The virtual copy is used as an input for the workflow system. The method keeps the project layout database up to date.

25 Claims, 18 Drawing Sheets

(56) References Cited

U.S. PATENT DOCUMENTS

| | | |
|---|---|---|
| 8,483,530 B2 | 7/2013 | Serensen et al. |
| 8,667,429 B2 * | 3/2014 | Rieger .................... G06F 30/39 |
| | | 716/51 |
| 9,026,962 B2 | 5/2015 | Kruberg et al. |
| 9,053,278 B1 * | 6/2015 | Odabasi ................ G06F 30/392 |
| 9,411,923 B2 | 8/2016 | Kruberg et al. |
| 2009/0307639 A1 | 12/2009 | Chapman et al. |

OTHER PUBLICATIONS

"Dynamic Scheduling of EDA Scientific Workflows in Hybrid Computing Environments," by Qinghao Shen et al., , 2019 IEEE 21st International Conference on High Performance Computing and Communications; IEEE 17th International Conference on Smart City; IEEE 5th International Conference on Data Science and Systems (HPCC/SmartCity/DSS), Aug. 10-12, 2019, pp. 313-320.

"Electronic Design Automation (EDA) Scheduling System in IC Design Industry," by Jia-Nian Zheng et al., 2019 IEEE International Conference on Smart Manufacturing, Industrial & Logistics Engineering (SMILE), Apr. 20-21, 2019, pp. 221-225.

"C-Based SoC Design Flow and EDA Tools: An ASIC and System Vendor Perspective," by Kazutoshi Wakabayashi et al., IEEE Transactions on Computer-Aided Design of Integrated Circuits and Systems (vol. 19, Issue: 12, Dec. 2000), pp. 1507-1522.

Computer-Aided Design of Analog and Mixed-Signal Integrated Circuits, by Georges G. E. Gielen et al., Proceedings of the IEEE, vol. 88. No. 12, Dec. 2000, pp. 1825-1852.

* cited by examiner

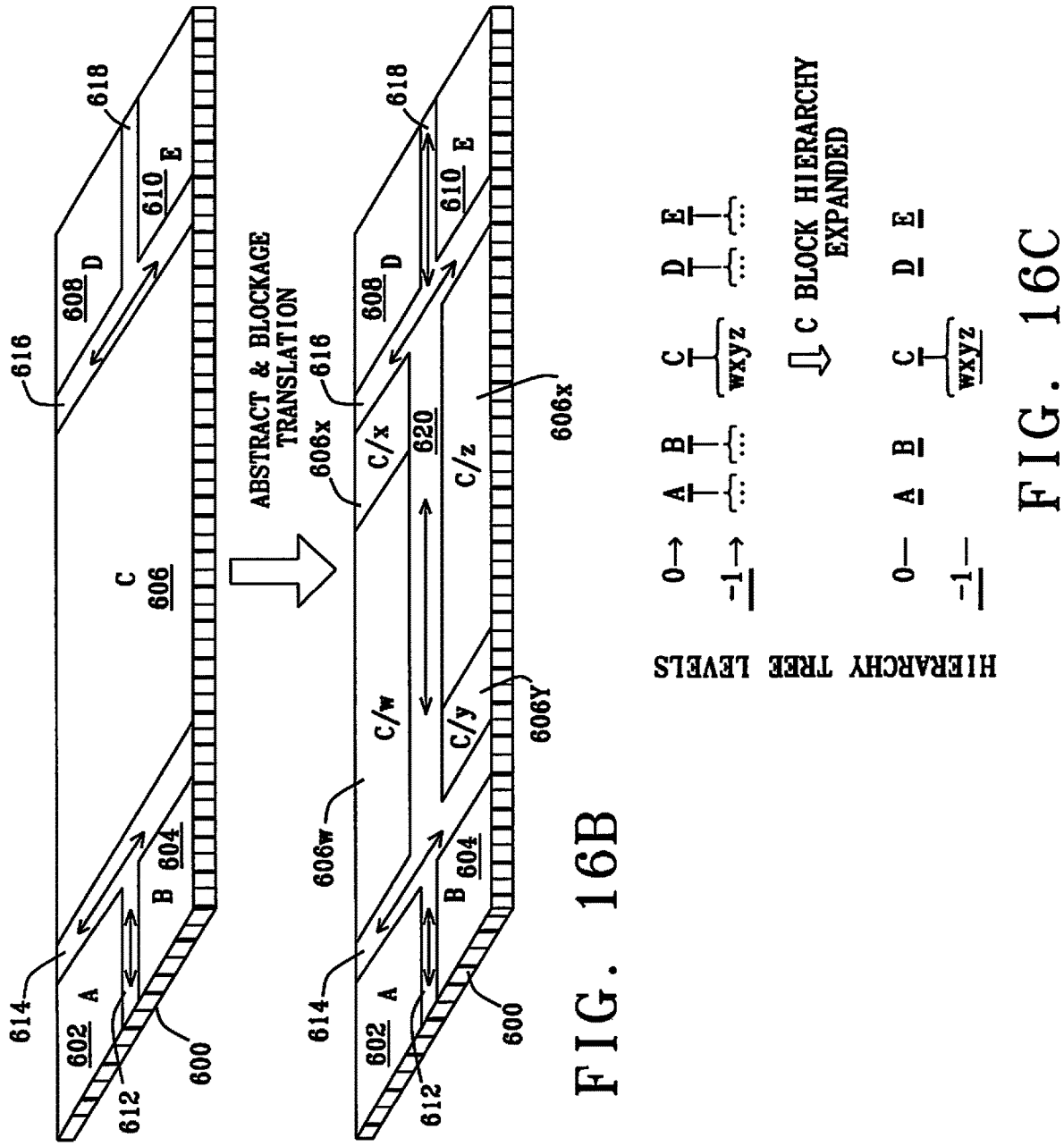

AUTOMATIC ROUTING SYSTEM WORKFLOW

TECHNICAL FIELD

This disclosure generally relates to providing systems and methods for automating, monitoring, and controlling the tasks that create wiring interconnection shapes for assembling circuits of integrated circuit chips. More particularly, this disclosure relates to providing systems and methods for automating, monitoring, and controlling routing rules definition for wiring interconnection shapes for assembling circuits of integrated circuit chips. Even more particularly, this disclosure relates to providing systems and methods for automating, monitoring, controlling, and maintaining a layout database of device and wiring interconnection shapes for assembling circuits of integrated circuit chips.

BACKGROUND

FIG. 1 is a flowchart of the process for the design, fabrication, and deployment of an electronic system. The design of an electronic system begins with the creation of system specification (Box 5). The system specification describes the stimulus input signals to be applied to the electronic system and the response signals to be generated by the electronic system. The stimulus signals and the response signal may be analog signals or digital signals. The electronic system structure will be analog or digital circuits that generate the response signals based on the stimulus signals. The system specification is then translated into a programming language such as C++ for simulating the function of the electronic system on a computer system. The programmed system specification is then used to create an architectural design (Box 10) in a hardware descriptor language such as VHDL (Verilog hardware descriptor language). The electronic system's hardware descriptor model is then synthesized into the functional units to create the electronic system's functional design (Box 15). If the circuits are logical circuits, a logic synthesis tool solves the Boolean algebraic equations to create the functional design (Box 15). Analog synthesis is more rudimentary at the time of the filing of this disclosure. The levels of abstractions for analog functions have not advanced to the point that analog can be easily automatically generated and must generally be designed by a talented engineer.

The functional units are then subdivided into physical structures such as portions of integrated circuit chips. The circuits of the subdivided physical structures maybe predesigned circuits commonly called "intellectual property" or customed designed circuits (Box 20). The circuit design (Box 20) for an integrated circuit with logical and analog circuitry is a hardware description language model within a database. The circuitry's hardware description language is used as preparation such that the circuits may be assembled as a physical design (Box 25). The physical design (Box 25) is an assembly of geometric structures representing the circuits' components. The components will be the transistors, resistors, inductors, and capacitors the form the electronic circuitry. The electronic circuits are placed on an integrated circuit chip's surface using optimization programs to ensure that they function properly. Further, the electronic circuits are interconnected with wiring routed on a single integrated circuit chip's surface. The wiring is placed between the circuits to further ensure the proper operation of the circuits.

Upon the completion of the physical design (Box 25), the placement of the circuits and the routing of the wiring is then verified (Box 30) to ensure the correct operation of the integrated circuit. Once the correct operation is assured, the design is approved (Box 30) for fabrication. The design is converted to a Graphic Database System Information Interchange (GDSII) format. The GDSII formatted data is transferred to an integrated circuit production facility for the fabrication (Box 35) of the integrated circuit chips.

The fabricated (Box 35) integrated circuit chips are then mounted (Box 40) into second-level packages (modules) and mounted on a printed circuit card or board. Alternately, the fabricated (Box 35) integrated circuit chips are mounted (Box 40) directly on the printed circuit cards or board. The printed circuit cards or boards with the integrated circuit chips placed as designed are then tested (Box 40) to verify the integrated circuit chip as mounted function as required. The printed circuit cards or boards with the integrated circuit chips are then installed (Box 45) in an electronic system.

FIG. 2 is a flowchart of the physical design, verification, and premanufacturing processing of an integrated circuit of the prior art. The circuit design (Box 20) of FIG. 1 includes the creation (Box 100) of a netlist of the interconnections of each of the circuits of the integrated circuit chip. The netlist data of each circuit's interconnections of the integrated circuit chip is retained in the netlist database 125.

The logical and analog circuits are each partitioned (Box 105) and assigned physical functional sections that fit within the integrated circuit chip's allocated area. The functional sections are assigned locations in the floorplanning and partitioning (Box 105) of the integrated circuit chip. In addition to the functional sections' assignment, the floorplanning and partitioning (Box 105) estimate the integrated circuit chip's die size. The floorplanning and partitioning (Box 105) also take into account the geometrical constraints of the integrated circuit chip such as bond pad locations, off-chip receivers and drivers, clustered areas (i.e., cache RAM, multiplier, barrel shifter, line driver, and arithmetic logic units), and custom intellectual property blocks.

The descriptions of the functional sections with their constraints are stored in the cell library 110. The estimates of the circuit designs' delays and the interconnecting netlists of the functional structures are stored in the cell/wire delay database 125.

After the floorplanning and partitioning (Box (105), the placement operation (Box 120) assigns the functional sections to essentially permanent locations. The location assignments are based on constrained optimization of the total wire length, the critical paths' timing, congestion of the complete wire routing resources, power minimization, and placement runtime minimization.

An essential part of an integrated circuit chip design is the clock tree synthesis (Box 130). With the current integrated circuit designs, clock trees synthesis requires electronic design tools that meet the timing requirements such that the design complies with the following clock tree quality parameters. The primary requirements for ideal synchronous clocks are minimum latency, minimum skew, proper duty cycle maintenance, a minimum uncommon path for logically connected registers, good signal Integrity maintenance, and minimum power dissipation.

While the clock tree synthesis (Box 130) is fundamentally included in the physical wire routing (Box 135), clock tree synthesis is separated because it determines the integrated circuit chip's operation and must perform to meet the above requirements. Once the clock tree synthesis (Box 130) meets its quality parameters, the physical wire routing (Box 135) for the integrated circuit chip's functional sections can be performed.

Physical wire routing (Box 135) adds metal or polysilicon conductive polygon segments needed to properly connect terminals on the placed functional sections while obeying all design rules for the integrated circuit. The physical wire routing (Box 135) is performed by computer-automated programs provided with a set of preexisting polygons consisting of pins or terminals for each of the functional sections or cells. In some functional sections, the internal wire routing of a particular functional section may have been accomplished by designing the specific functional section.

In creating the netlist (Box 100), each net of the integrated circuit chip interconnects at least two functional sections or cells. An alphanumeric identifier identifies the integrated circuit chip interconnects. The physical wire routing (Box 130) program then determines a route for each of the nets according to algorithms known in the art. The physical wire routing (Box 135) program forms the wire route by creating geometries such that all terminals connected to the functional sections are assigned to the same net are connected, and no terminals assigned to different nets are connected. The physical wire routing program ensures that all design rules are obeyed and that the design meets the timing requirement. Further, there must be no crosstalk problems in the wire routing, and the wiring must meet the metal density requirements and not suffer from antenna effects. Upon completing the physical wire routing (Box 135), the data describing each network's wiring structure is transferred to the layout database 140.

As part of the physical wire routing program, the physical dimensions of each of the network of interconnections are transferred to the resistance/capacitance extraction process (Box 145). The resistance/capacitance extraction process (Box 145) determines each wiring segment's resistance and capacitance for each of the networks of interconnections of the integrated circuit. The resistance/capacitance data of the segments of each of the network of interconnections is transferred to the cell/wire delay database 125 for use in future floorplanning, partitioning, and placement.

Upon completion of the physical wire routing (Box 135) and the completion of the resistance/capacitance extraction process (Box 145) of the resistance/capacitance data of the segments of each of the network of interconnections, the physical verification process (Box 150) is executed. The wiring data of each of the interconnections network segments are retrieved from the layout database 140, and the resistance/capacitance data of the segments of each of the network of interconnections is transferred from the resistance/capacitance extraction process (Box 145). The physical verification process (Box 150) validates that the segments of each of the interconnections network are correct, that the resistance/capacitance of the segments of each of the network of interconnections does not exceed maximum margins.

Technology data is extracted from the technology files 155 and used by the physical verification process (Box 150) to ensure that the segments of each of the network of interconnections comply with the technical limits of the integrated circuit fabrication process.

The layout post-processing (Box 160) is the preparation of mask data by translating the wiring data of the segments of each of the network of interconnections into a set of instructions that a photomask generator can use to generate a physical mask. Typically, amendments and additions to the chip layout are performed to convert the physical layout into mask production data. Upon completing the layout post-processing, the mask writer generates (Box 165) the mask for transfer to the integrated circuit processing line to fabricate the integrated circuit.

The current practice for auto-routing physical wiring tracks of a layout of an integrated circuit design is to perform each step of the method of FIG. 2, with a minimal level of automation in the form of a workflow system.

The current practice of routing of physical wiring to a high level of complexity to execute a series of tasks for preparing the layout database to receive and perform the routing of the physical wiring tracks with a combination of manually and automatically routed features leads to a set of disadvantages. The disadvantages are:

The prolonged execution time of all workflow tasks to have the final layout database auto-routed;

Lack of control for the workflow procedures and prerequisites.

No standardization of the performance of tasks;

Not an ideal workflow to be used in multi-site project execution;

The extra time invested in the workflow execution due to debug and trial and error;

It does not provide a consistent level of auto-routing results;

Critical tasks are not auto-routed, and critical signals are routed manually;

Specific knowledge and experience is required to employ the auto-routing workflow;

FIGS. 3A, 3B, and 3C are layout diagrams of two wiring layers and a dielectric layer of an integrated circuit illustrating the prior art's wiring structure. FIG. 3A illustrates a first metallization layer, FIG. 3B illustrates a dielectric layer, and FIG. 3C illustrates a second metallization layer. In FIG. 3A, the metal wires 200*a* are oriented to be vertical on the first metallization layer. At the area 200*c*, the vertical metal wires 200*a* turn to become the horizontal metal wires 200*d*. The second grouping of vertical metal wires 200*b* is turned at area 200*e* to form a portion of the horizontal metal wires 200*f*. This grouping of the horizontal metal wires 200*g* is terminated at the two sets of through-silicon vias (TSV) 205*c* and 205*d*. Referring to FIG. 3B, the two sets of TSV's 205*c* and 205*d* are etched into the interlayer dielectric that is formed between the first metallization layer in FIG. 3A and the second metallization layer in FIG. 3C. In FIG. 3C, the two sets of TSV's 205*c* and 205*d* are connected to the vertical metal wires 210*a*. The vertical metal wires 210*b* on the second metallization layer of FIG. 3C are connected to the set of TSV's 205*b* and thus connected to the horizontal metallization wires 200*g* of FIG. 3A. The horizontal metallization wires 200*g* are connected to the TSV's 205*a*. The TSV's 205*a* are transferred through the dielectric layer of FIG. 3B to the second metallization layer of FIG. 3C and are connected to the horizontal wires 210*e*. The horizontal wires 210*e* are connected to the vertical wires 210*g* at the turning area 210*f*. The vertical wires 210*c* of FIG. 3C are lead to the turning points 210*h* to become the horizontal wires 210*d* of FIG. 3C.

The structures of FIGS. 3A, 3B, and 3C illustrate the common practice of routing without an automated workflow. Single metal routing orientation is not respected as metal wiring tracks are routed horizontally, vertically, or both. The transition from one metal layer to another follows a convenient pattern to ease the manual task of laying out the metal tracks through the integrated circuit layers.

SUMMARY

An object of this disclosure is to provide a method for automating workflow for routing of metal wiring structures on an integrated circuit.

Another object of this disclosure is to provide a network of computing systems with non-transitory memory apparatus for storing computer program code configured to perform a method for automating workflow for routing of metal wiring structures on an integrated circuit.

To accomplish at least one of these objects, a method for automating workflow for routing of metal wiring structures on an integrated circuit begins with defining the options for the workflow, setting the necessary variables, and providing the database identification and locations. The workflow options, the essential variables, and the database identification and location are physical inputs to a networked computing system performing the automated workflow method.

Management and control engine processes are a master program code that acknowledges the input data and option settings and accesses the layout database that resides in one or more cloud storage locations. The management and control engine processes the make a virtual copy of the layout database to be auto-routed. The copied layout database contains the layout data (abstract generated), block's floorplanning/placement, routing channel definitions, connectivity (interconnections to be auto-routed), routing constraints to be fulfilled. The management and control engine processes then prepare the layout database by editing the virtually copied layout database files to place the layout database files to execute the auto-routing engine process. The principal database modifications include abstract and blockage generation. Additionally, specific routines are required for compatibility with the auto-routing engine process.

Once the layout database is suitably prepared, the management and control engine processes activate an auto-routing engine process. The auto-routing engine process places metal wiring segments for each wiring connection of the integrated circuit's interconnection networks. The metal wiring segments connect each of the macro circuits to form each interconnection. The auto-routing engine process determines the routing of the interconnections, ensuring that each of the metal wiring segments obeys all the wiring design rules and constraints for the integrated circuit. The auto-routing engine process must further create the wiring segment geometries such that all the terminals assigned to the set of wiring interconnections are connected. No wiring segments assigned to different wiring interconnections can be connected.

Each of the macro circuits has preexisting terminals within the macro circuits. The assigned interconnections between macro circuits are connected to the terminals, and the wiring segments are placed to make the wiring interconnection. The macro circuits also may have preexisting wiring connections for interconnecting components within the macro circuit. In the routing of the wiring interconnections for the integrated circuit, at least one computing system operating the auto-routing engine process must avoid the pre-routed wiring interconnections.

In deciding the routing pattern for each of the wiring segments, the computing system operating auto-routing engine process places the wiring segments on a coarse grid of the integrated circuit. Each of the interconnections of the integrated circuit is then placed in sequence. The layer assignment may be accomplished with the initial global routing. If all the integrated circuit interconnections are not completed, at least one computing system operating the auto-routing engine iterates the process. The reiterated process rips-up and reroutes interconnections with shorts or opens in the interconnection, or the wiring segments do not obey the wiring design rules.

When the wiring interconnections for the integrated circuit are completed, at least one computing system is directed to activate an auto-routing engine analysis process for performing an auto-routing or routing analysis. This analysis includes verifying that the routing of the wiring interconnections is logically equivalent to the design's original description. At least one computing system operating the auto-routing or routing analysis engine process includes extracting the resistance and capacitance of each of the interconnections of the integrated circuits. From the resistance and capacitance, at least one computing system operating the auto-routing or routing analysis engine process determines the integrated circuit's timing performance and evaluates the timing performance against the design timing calculations. The performance is determined and compared with the original design goals. The noise margin is then calculated by at least one computing system operating the auto-routing or routing analysis engine process to determine the circuits' performance and establish if there will be excess noise on the integrated circuit.

The management and control engine processes then dispatch at least one auto-routed data merge engine process to merge the auto-routed database to the layout database resident in the cloud storage system. The management and control engine processes the save the final layout to a project database stored in the cloud storage system. The management and control engine processes then clean the layout database. In the cleaning, the management and control engine processes delete all temporary layout databases generated as part of the auto-routing engine execution preparation since the auto-routed or analysis resultant data has been saved on the project database. After the virtual database cleaning, the auto-routing is completed.

To accomplish at least one of the objects, an interconnected plurality of computing systems where each of the computing systems has at least one non-transitory memory apparatus for storing computer program code. The program code is configured for performing a method for automating workflow for routing of metal wiring structures on an integrated circuit, as described above. In some embodiments, the interconnected plurality of computing systems includes cloud storage systems for retaining the layout database, the netlist database, the layout constraints database, the auto-routing wiring rules, and the final merge layout database.

In some embodiments, the database preparation before auto-routing includes preserving a hierarchy tree and achieving auto-route through the hierarchical macro circuit by creating new abstracts and blockages for the macro circuit. The sub-macros are translated into an abstract and blockage. The abstract and blockage preserve its location on the hierarchy tree. Consequently, the macro circuit will have hierarchical sub-macros updated with an abstract and blockage representation that allows the auto-routing through the macro circuit's space.

BRIEF DESCRIPTION OF THE DRAWINGS

FIGS. 16B and 16C are diagrams of a method for expanding the hierarchy of a large macro circuit into smaller macro circuits to allow the automated routing of metal wiring structures on an integrated circuit embodying the principles of the present disclosure.

DETAILED DESCRIPTION

Figure 4:
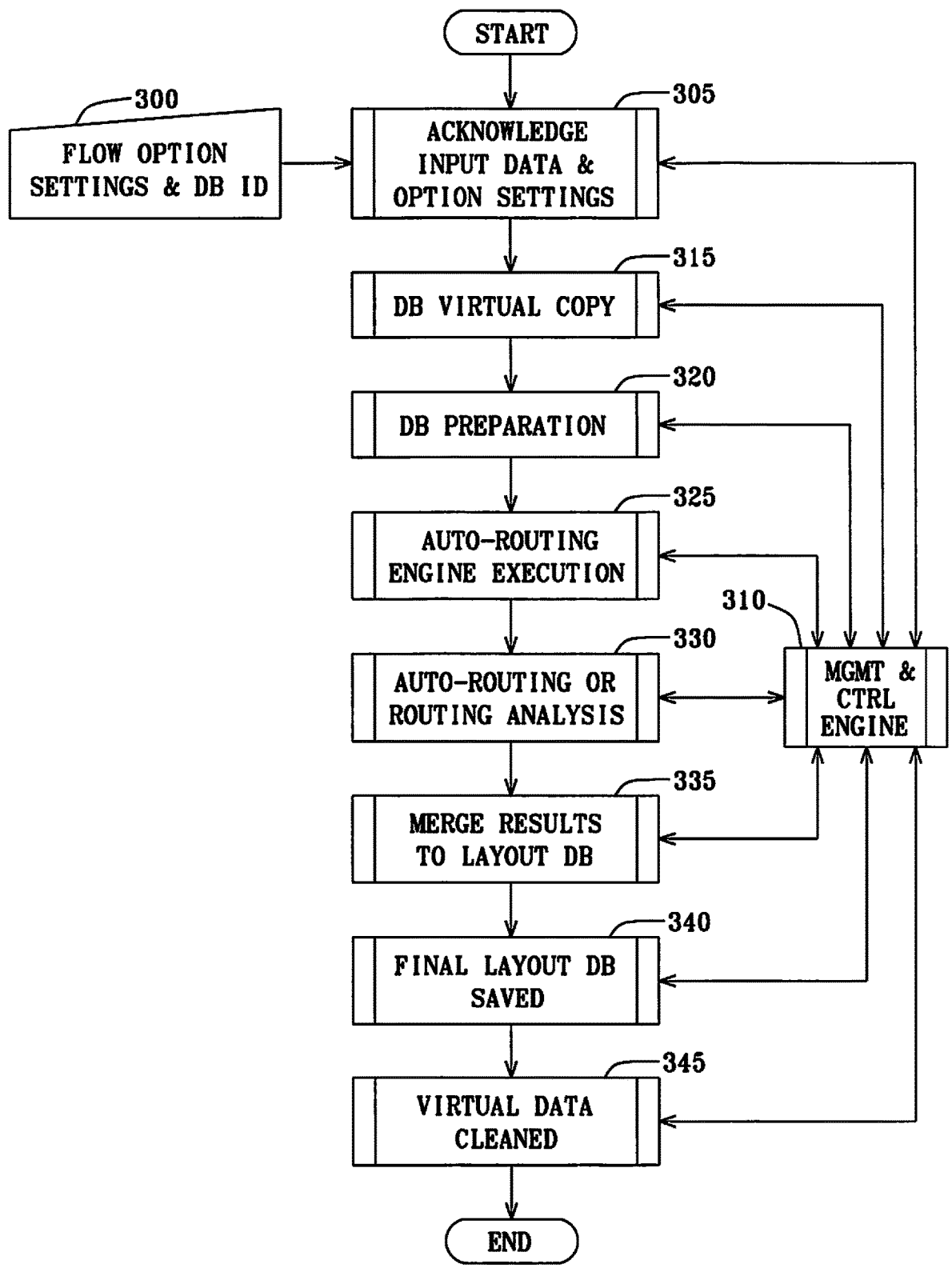
FIG. 4 is a flowchart illustrating a high-level overview of a process for automated workflow for routing of metal wiring structures on an integrated circuit embodying the principles of the present disclosure.

FIG. 4 is a flowchart illustrating a high-level overview of a method for automated workflow for routing of metal wiring structures on an integrated circuit embodying the principles of the present disclosure. The method for the automated workflow consists of an application programming interface (API). The API is a computing interface that defines interactions between multiple software programs being executed by a computing system. The method begins with the workflow options, the variable setting, and the database identification and locations are provided (Box 300) as physical inputs to the computing system. The management and control engine 305 is a master program executed on the designated controlling computer system. The management and control engine 305 acknowledges (Box 305) the input data and option settings, accesses, and makes (Box 315) a virtual copy of the layout database to be auto-routed. The layout database contains the layout data (abstract generated), block's floorplanning/placement, routing channel definitions, connectivity (interconnections to be auto-routed), routing constraints to be fulfilled. The database is then prepared (Box 320) by editing the virtually copied layout database files to place the layout database files in condition for executing the auto-routing engine process (Box 325). In principle, the database modifications include abstract and blockage generation with the addition of specific routines required for compatibility to the auto-routing engine stage.

The database preparation (Box 320) consists of translating the copied layout data into an abstract representation that is a simpler database to speed up the routing engine process that does not require the full layout data.

Once the database is suitably prepared, the management and control engine 310 activates an auto-routing engine process (Box 325) for the integrated circuit's wiring auto-routing. The auto-routing engine process (Box 325) places metal wiring segments for each wiring connection of the network of interconnections of the integrated circuit. The metal wiring segments connect each of the macro circuits to form each interconnection. As it determines the routing of the interconnections, the auto-routing engine ensures that each of the metal wiring segments obeys all the wiring design rules for the integrated circuit. The auto-routing engine must further create the wiring segment geometries such that all the terminals assigned to the set of wiring interconnections are connected. No wiring segments assigned to different wiring interconnections can be connected.

Each of the macro circuits has preexisting terminals within the macro circuits. The assigned interconnections between macro circuits are connected to the terminals, and the wiring segments are placed to make the wiring interconnection. The macro circuits also may have preexisting wiring connections for interconnecting components within the macro circuit. In the routing of the wiring interconnections for the integrated circuit, the auto-routing engine must avoid the pre-routed wiring interconnections.

In deciding the routing pattern for each of the wiring segments, the auto-router places the wiring segments on a coarse grid of the integrated circuit. Each of the interconnections of the integrated circuit is then placed in sequence. The layer assignment may be accomplished with the initial global routing. If all the interconnections of the integrated circuit are not completed, the auto-routing engine iterates the process with rip-up and reroute for interconnections that have shorts or opens in the interconnection or the wiring segments do not obey the wiring design rules.

When the wiring interconnections for the integrated circuit are completed, the management and control engine 310 activates an auto-routing or routing analysis (Box 330). This analysis includes verifying that the routing of the wiring interconnections is logically equivalent to the design's original description. The auto-routing or routing analysis (Box 330) also includes extracting the resistance and capacitance of each of the interconnections of the integrated circuits. The integrated circuit's timing performance is determined and evaluated against the design timing calculations from the resistance and capacitance. The performance is determined and compared with the original design goals. The noise margin is then calculated to determine the circuits' performance and establish if there will be excess noise on the integrated circuit.

Figure 1:
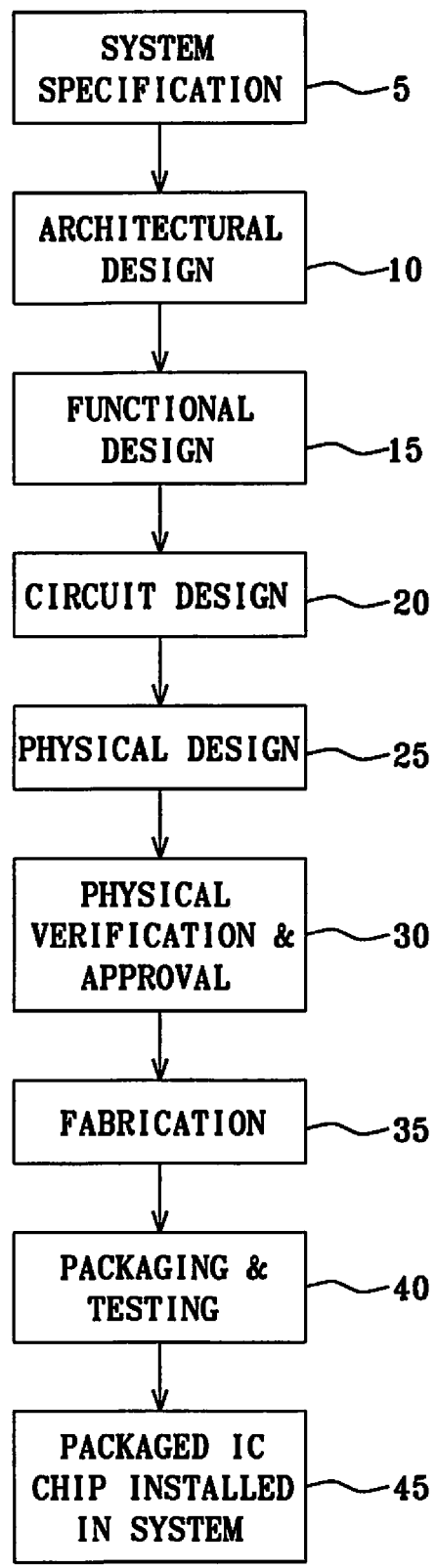
FIG. 1 is a flowchart of the process for the design, fabrication, and deployment of an electronic system of the prior art.

The auto-routed database is then merged (Box 335). The layout database and the final layout are then saved (Box 340) to a project database. The layout database is then cleaned (Box 345). In the cleaning, all temporary layout databases generated as part of the preparation for the auto-routing engine execution is consequently deleted since the auto-routed or analysis resultant data has been saved on the project database. After the virtual database cleaning (Box 345), the auto-routing is completed, and the verification and approval (Box 30) are made before fabrication (Box 35) of FIG. 1.

Figure 5A:
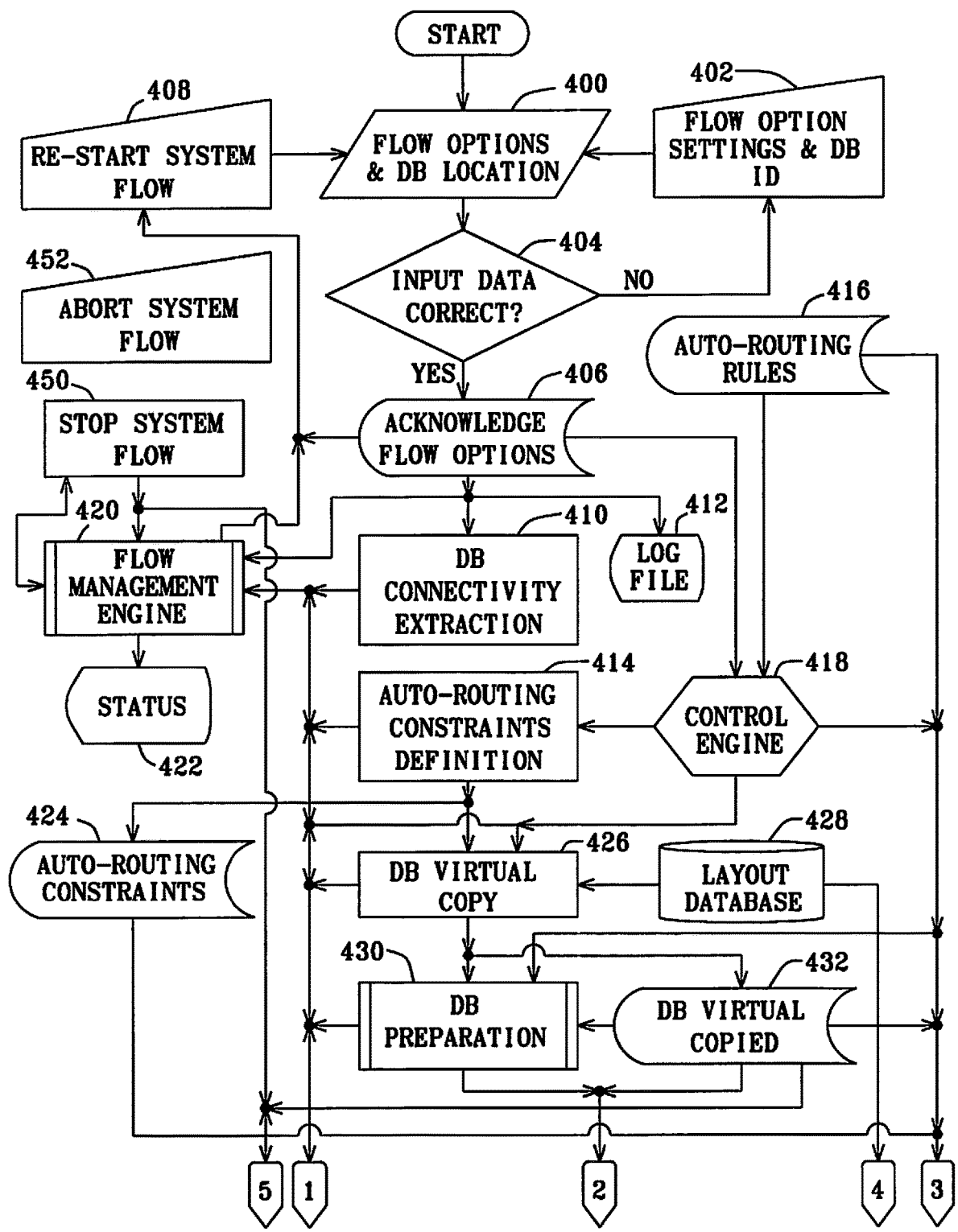
FIGS. 5A and 5B are a flowchart illustrating a process of a detailed implementation for automated routing of metal wiring structures on an integrated circuit embodying the principles of the present disclosure.
Figure 5B:
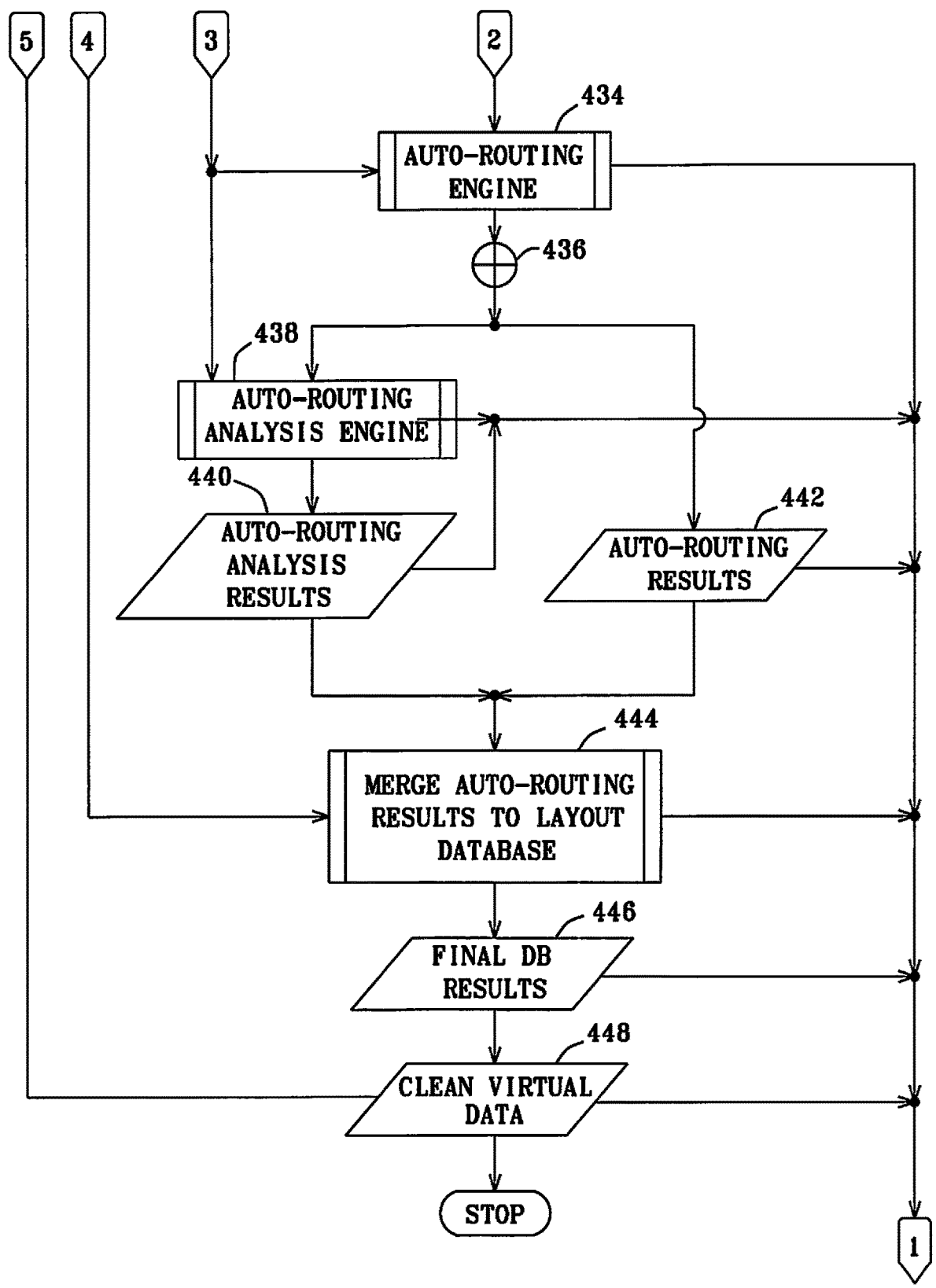
Figure 6:
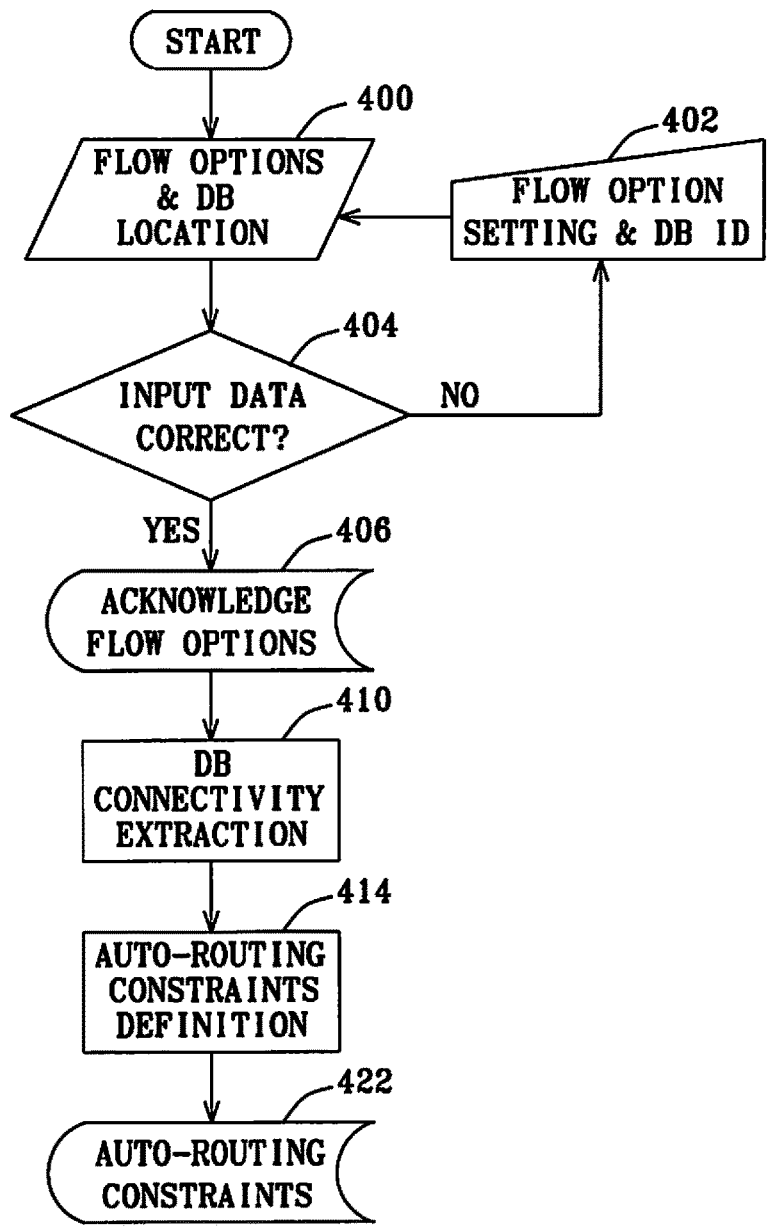
FIGS. 6-13 are segments of the flowchart of FIGS. 5A and 5B for detailing the operations of the process for automated routing of metal wiring structures on an integrated circuit embodying the principles of the present disclosure.
Figure 16A:
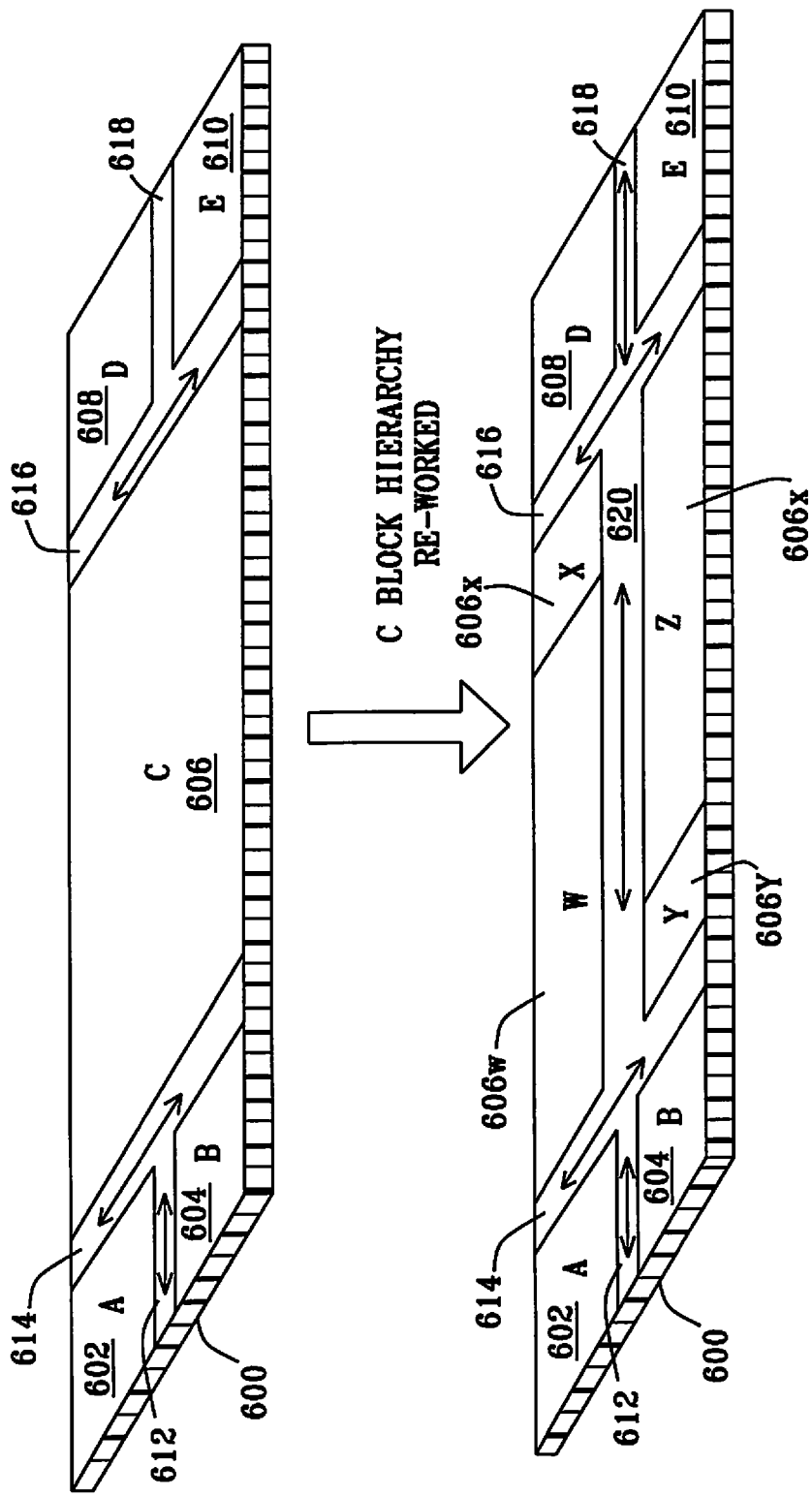
FIG. 16A is a diagram of two portions of an integrated circuit having large macro circuit designs and illustrating how the large macro is divided to allow wiring of the prior art's integrated circuit.

FIGS. 5A and 5B are a flowchart illustrating a process of a detailed implementation for automated routing of metal wiring structures on an integrated circuit embodying the principles of the present disclosure. FIGS. 6-12 are segments of the flowchart of FIGS. 5A and 5B for detailing the operations of the process for automated routing of metal wiring structures on an integrated circuit embodying the principles of the present disclosure. Referring initially to FIGS. 5A and 6, FIG. 6 shows the initializing routing process, with the input (Box 400) of the flow options and data location. The flow options include:

- List of blocks that required extra processing to allow routing across its hierarchy (Auto-Routing Through Hierarchies-Expand Cell), as described in FIGS. 16A and 16B;
- Blockage extension value in microns;
- Routing channels congestion analysis is optionally performed.
- A number of available metal layers to auto-route; and
- Update the latest auto-routing constraints definition or not.

The data necessary for the auto-routing is retrieved from the database and verified for its being correct (Box 404). If the data is not correct, the flow option setting and the database identification are manually entered (Box 402) a second time with the errors corrected. When the flow options are found (Box 404) to be correct, the flow options are stored in a memory within the computing system executing the flow control. The flow options are stored (Box 406) at a temporary location with an acknowledgment of their being correct.

The integrated circuit connections as captured in the netlist and the nets stored within the macro circuits are extracted (Box 410) from the database. The database contains layout floorplanning, netlist, hard and soft IP layout blocks.

The auto-routing constraints are specific instructions defined (Box 414) for the auto-routing engine process (Box 434) to create the layout interconnections' metal wiring segments. The predefined auto-routing engine process (Box 434) definitions are acknowledged from the schematic database, formatted, and stored (Box 422) at a temporary location to serve as the input for the auto-routing engine process (Box 434).

Figure 7:
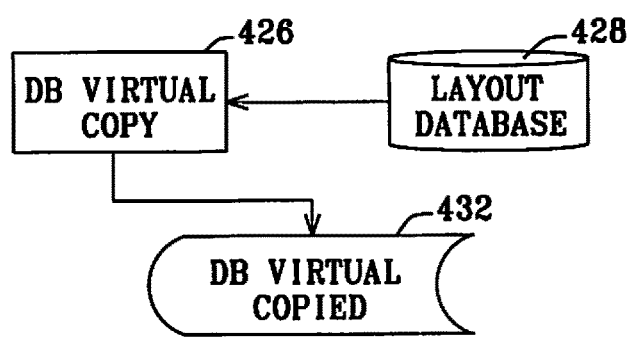

Referring now to FIGS. 5A and 5B, FIG. 7, when the auto-routing constraints are defined (Box 414) and stored (Box 422), the identified layout database is retrieved from storage 428, and the database is virtually copied (Box 426) to a temporary location. This stage's level of control is mostly related to how many hierarchy levels should be considered for copy and some specific considerations for database preparation (Box 430).

Figure 8:
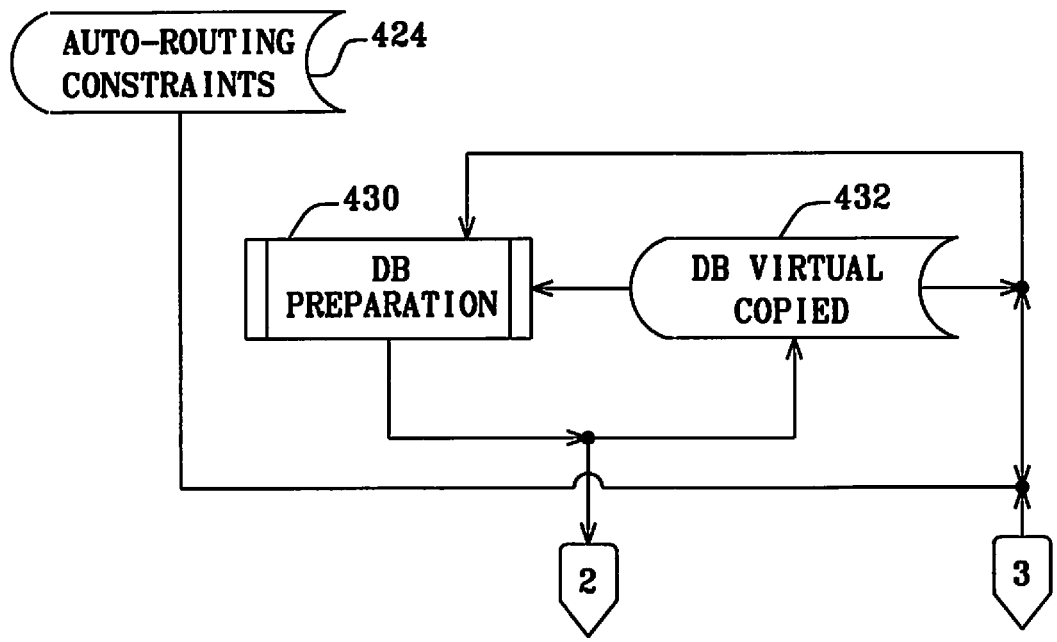

Referring to FIGS. 5A and 5B, FIG. 8, the virtually copied database and the auto-routing constraints (Box 424) are extracted from the temporary storage 432 and 424. The virtually copied layout database is edited (Box 430) to prepare the virtually copied layout data to be accessed by the auto-routing engine process (Box 434) for positioning the metal wiring segments on the integrated circuit. The layout database modifications include abstract and blockage generation with the addition of specific routines that would be required for compatibility to the auto-routing engine stage.

Figure 9:
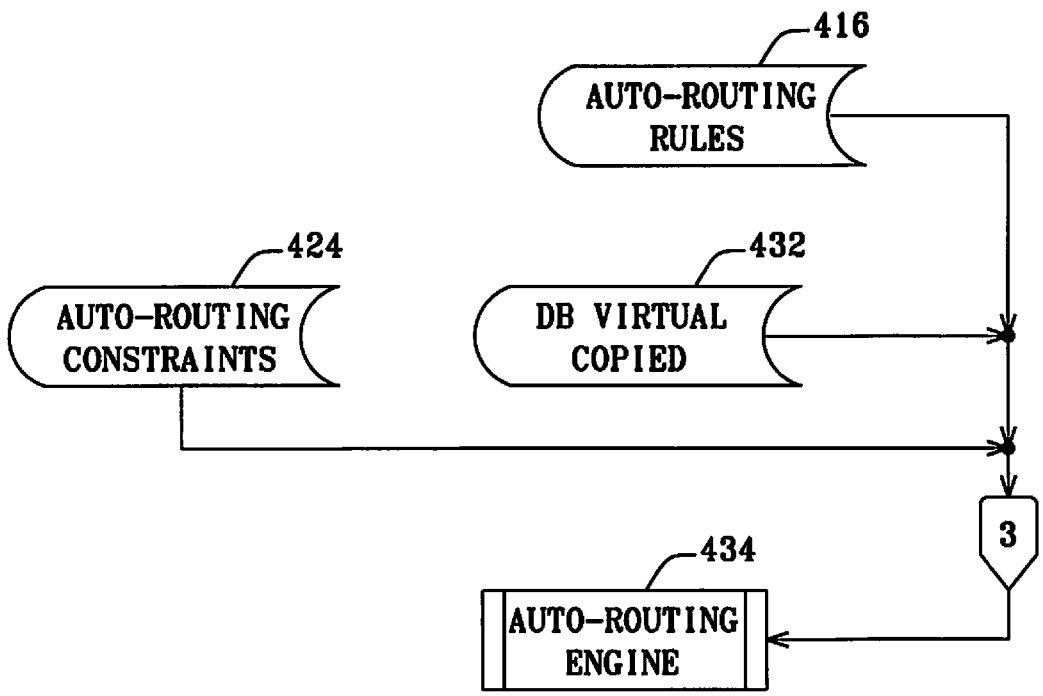

Referring now to FIGS. 5A and 5B and 9, the locally stored auto-routing rules 416 derived from the technology design kit that describes the minimum and maximum spacings between the wiring segments, the minimum and maximum wire segment widths, and other constraints for layout. The auto-routing rules 416, the auto-routing constraints 424, and the virtually copied layout database 432 are transferred to the auto-routing engine process (Box 434). The auto-routing engine process (Box 434) performs the routing. It generates specific data to support further post-processing analysis to identify particular issues encountered in the layout database that affects the convergence and compliance of the auto-routing results.

Figure 10:
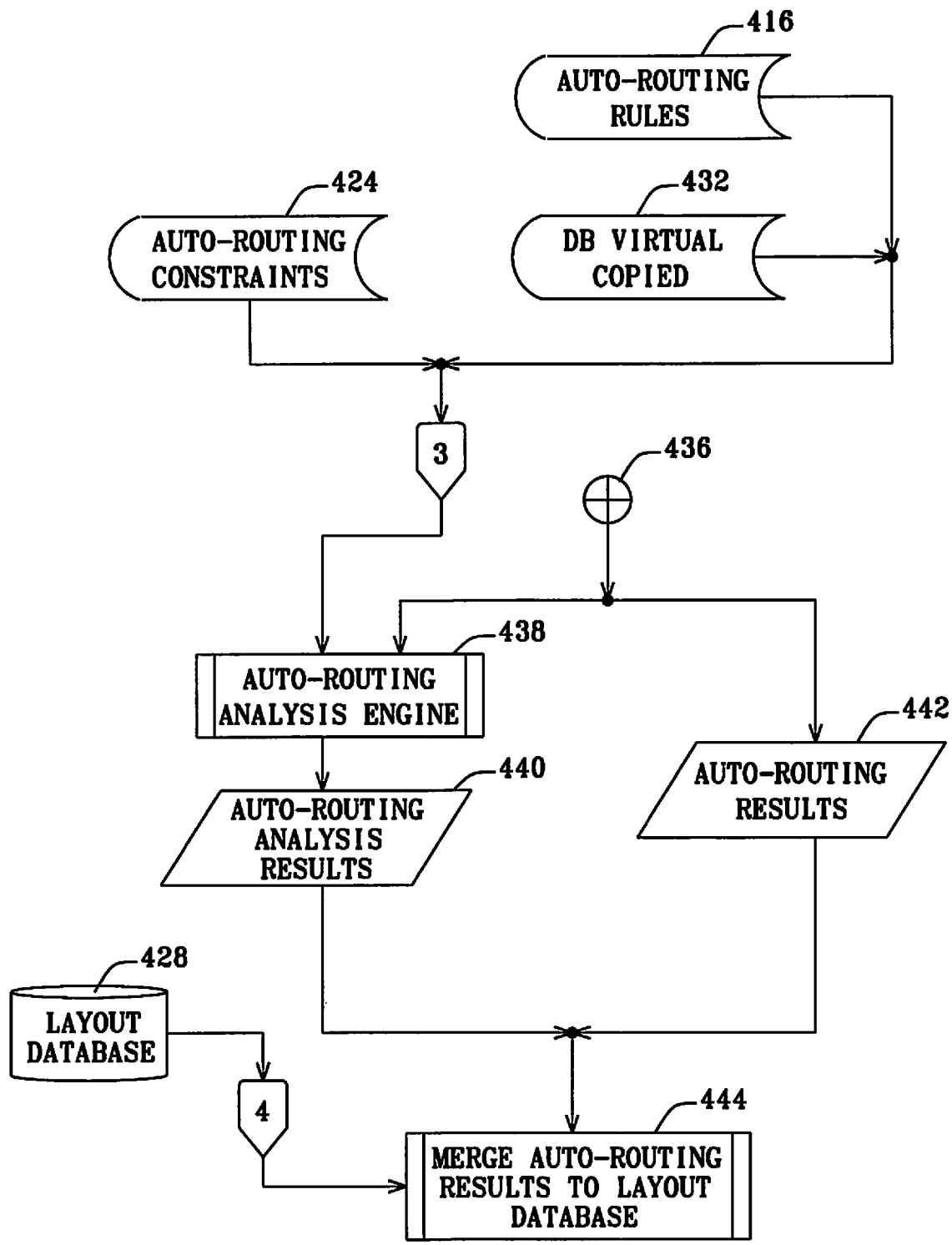

Referring now to FIGS. 5A and 5B and 10, The auto-routing rules 416, the auto-routing constraints 424, and the virtually copied layout database 432 are transferred to the auto-routing analysis engine process (Box 438). The auto-routed layout results of the auto-routing engine process (Box 434) are transferred by way of the logical OR node 436 to the auto-routing analysis engine process (Box 438) or to transferred (Box 442) to be merged (Box 444) with the layout database 428. The auto-routing results are transferred through the logical OR node 436 to the auto-routing analysis engine process (Box 438). The auto-routing rules 416, the auto-routing constraints 424, and the auto-routing results are analyzed to ensure that the auto-routed results are correct when compared to the netlist and when each of the wiring segments obeys the wiring rules. Further, the analysis verifies that the power dissipation, signal integrity, and noise generation meets the specifications. The analysis results are then transferred (Box 440) to be merged (with the layout database 428.

Figure 11:
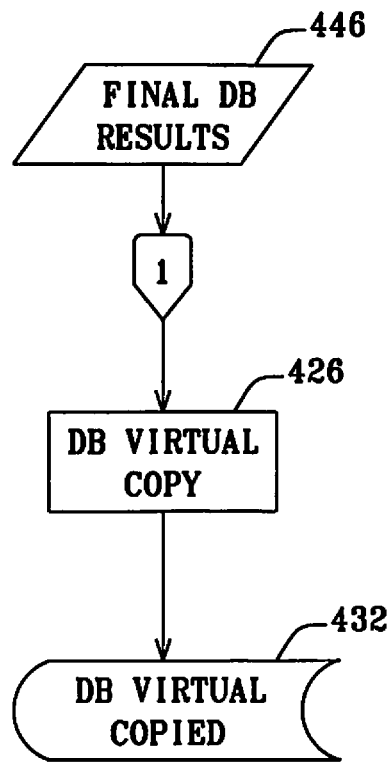

Referring now to FIGS. 5A and 5B and 11, The final database results from the merging (Box 444) are transferred (Box 446) to be virtually copied to the database virtual storage 432.

Figure 12:
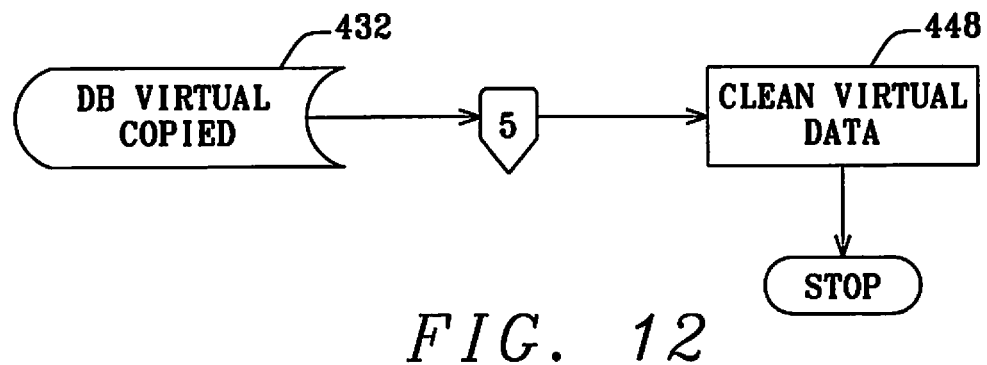

Referring now to FIGS. 5A and 5B, and 12, the last stage of the workflow is cleaning (Box 448) the virtual database 432. All temporary layout databases generated as part of the auto-routing engine execution preparation is deleted because the auto-routed data and the resultant analysis resultant data has been saved on the project database 428.

Figure 13:
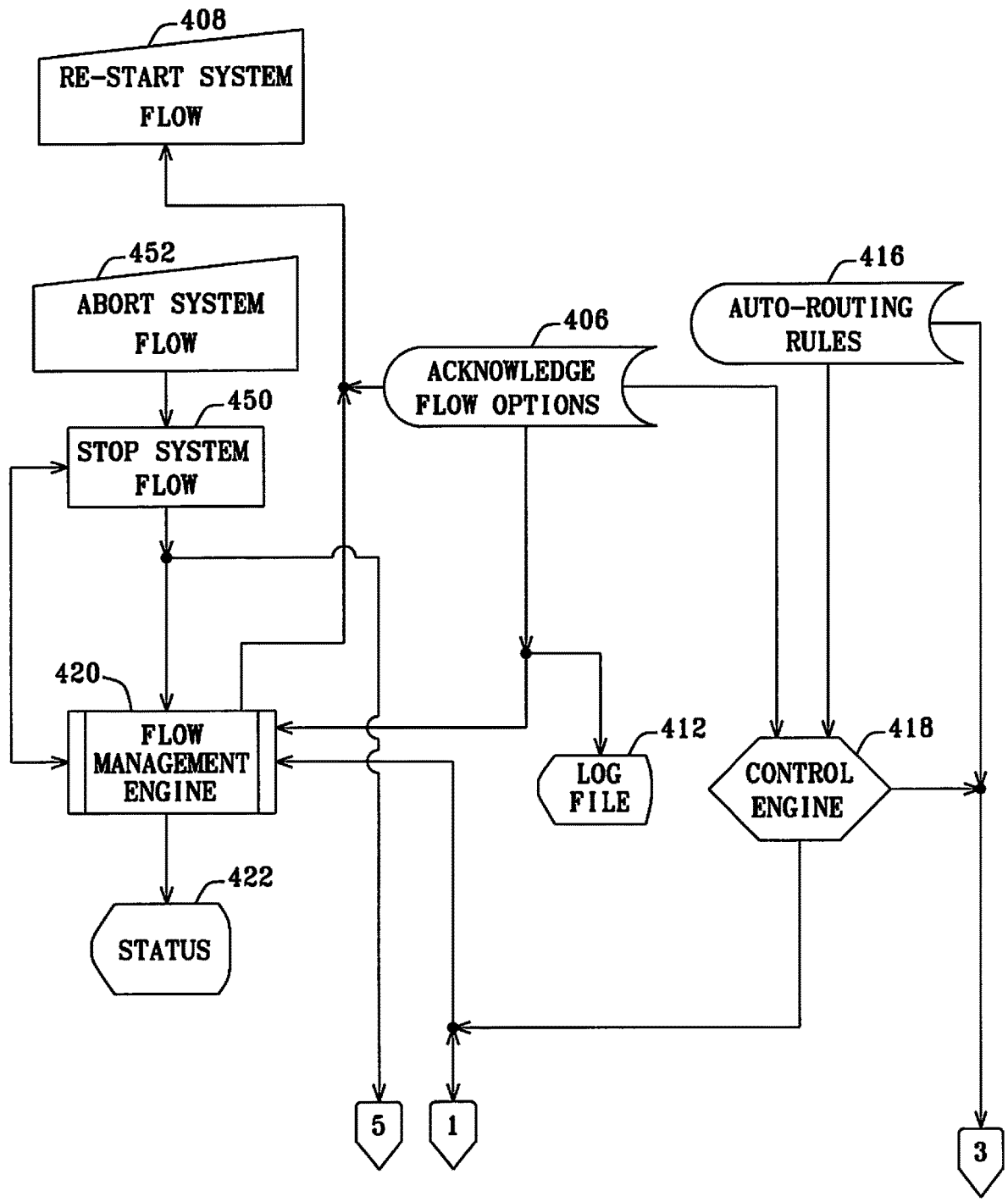

Referring now to FIGS. 5A and 5B and 13, the flow management engine process (Box 420) provides monitoring the input flow option data and database location stored in a temporary location (Box 406) with an acknowledgement; the connectivity data extracted (Box 410) from the input netlist database; the auto-routing constraints definition data generated (Box 414) from the flow option data 406 and the auto-routing rules data 416; the layout database virtual copying (Box 426); the database preparation process edits (Box 430) the virtually copied layout database to prepare the layout data to be accessed by the auto-routing engine process (Box 434); the virtually copied layout data of the auto-routing engine process (Box 434) during positioning the metal wiring segments on the integrated circuit; the results data of the auto-routing analysis (Box 438); the results of the auto-routing 442 and the data of the layout database 428 are monitored; and cleaning 448 of virtual layout database with the newly auto-routed wiring.

The flow management engine process (Box 420) analyzes the data resulting from the processes (Boxes 406, 410, 414, 426, 430, 434, 438, 444). The flow management engine process (Box 420) will determine that given levels of fault severities exist. Depending on the severity level of the faults, the flow management engine process (Box 420) will report the failure only if it has a minor impact on the results but will stop (Box 450) the workflow system due to a severe fault.

A display 422 operating through a GUI (Graphical User Interface) displays reports of each of the workflow stage status monitored by the flow management engine process (Box 420) together with a log file (412), informing the end-user how the workflow is running through the stages. The option to stop (Box 450) the workflow system is given to the user if a hard stop (Box 450) is required due to a layout database update, auto-routing constraints modifications, or auto-routing progress issues, for example, the virtual database copy 432 is deleted. A subsequent re-start (Box 498) is performed, preserving the initial options settings and considers updates on the layout database and auto-routing constraints.

The control engine preparation process (Box 418) modifies some procedures depending on how the user has chosen the option settings. The control engine preparation process (Box 418) selectively alters the auto-routing constraints 424, database virtual copy 432, and auto-routing engine 434 are the main controlled procedures. The modifications to the processes intended to make the workflow system produce the desired results according to the user requirements.

Figure 14:
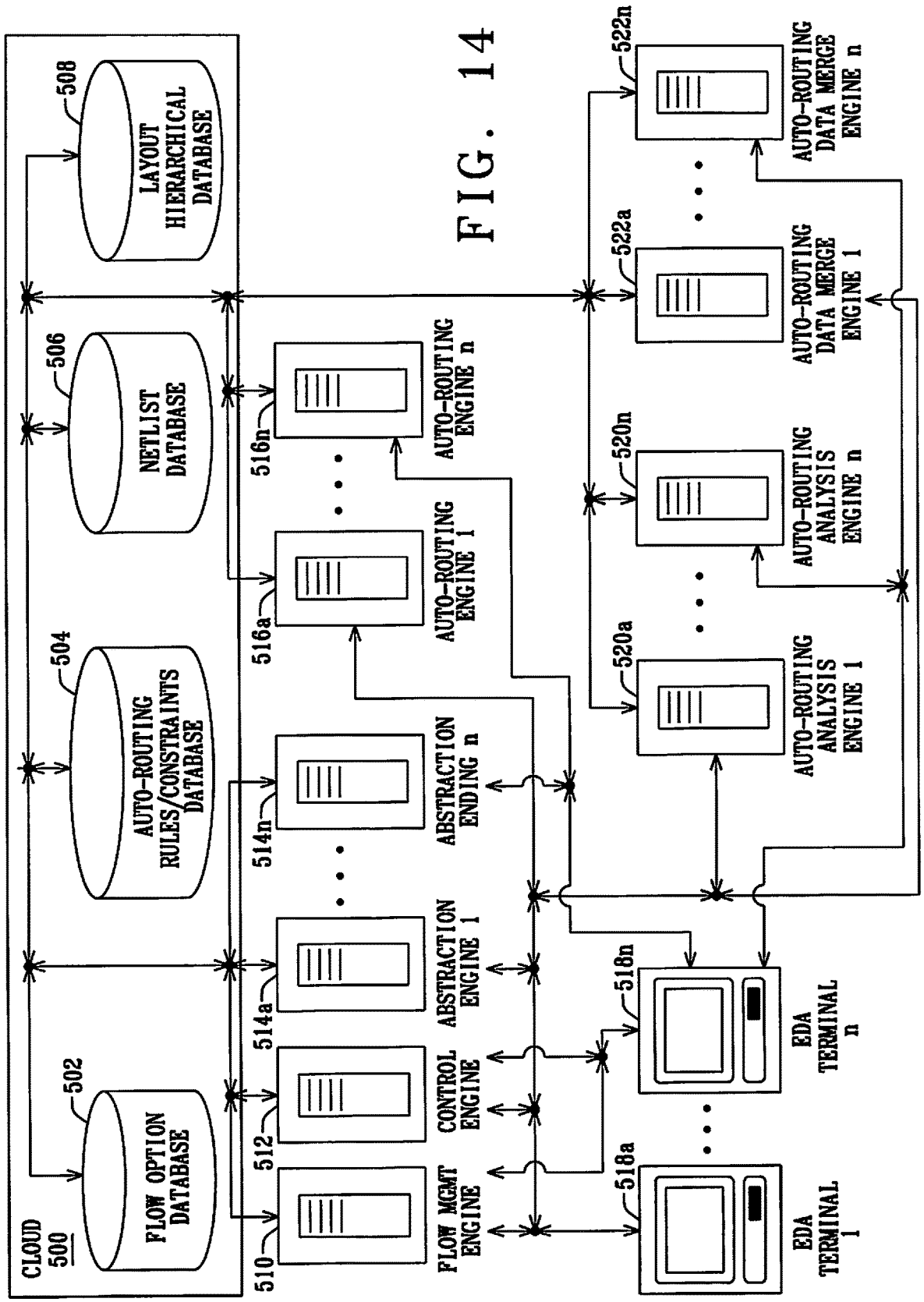
FIG. 14 is a block diagram of an automated computing system structured for routing metal wiring structures on an integrated circuit embodying the principles of the present disclosure.

FIG. 14 is a block diagram of an automated computing system structured for routing metal wiring structures on an integrated circuit embodying the principles of the present disclosure. The automated computing system has one or more electronic design automation terminals 518a, . . . , 518n that provides a graphic user's interface for integrated circuit designers access to the automated computing system. The electronic design automation terminals 518a, . . . , 518n are connected to a flow management engine processing system 510 and a control engine processing system 512. The integrated circuit designers enter the workflow options, the variable setting, and the database identification and locations to the electronic design automation terminals 518a, . . . , 518n. The electronic design automation terminals 518a, . . . , 518n transfer workflow, the variable setting, and the database identification to the flow management engine processing system 510 and a control engine processing system 512, which in turn transfers the workflow, the variable setting, and the database identification to the flow option database 502 for use in the auto-routing process. The control engine processing system 512 will extract the netlist data from the netlist database 506 for placement in one of the temporary storage of the abstraction engine processing system 514a, . . . , 514n to create a virtual copy of a netlist to be used for creating a layout. The netlist's hierarchical abstraction levels are separated by one of the abstraction engines 514a, . . . , 514n. These levels become the foundation for creating the virtually copied layout database of the integrated circuit. Further, the abstraction engine processing system 514a, . . . , 514n defines the auto-routing constraints added to the layout foundation of the virtually copied layout database. The flow management engine processing system 510 and a control engine processing system 512 stores the layout foundation of the virtually copied layout database in the layout hierarchical database 508.

The flow management engine processing system 510 and a control engine processing system 512 then performs a database preparation on the virtually copied layout database stored in the layout hierarchical database 508. The virtually copied layout database is edited to prepare the virtually copied layout data to be accessed by the auto-routing engine processing systems 516a, . . . , 516n for positioning the metal wiring segments on the integrated circuit. The auto-routing engine processing systems 516a, . . . , 516n retrieve the virtually copied layout database from the hierarchical layout database 508 and the netlist from the netlist database 506.

Additionally, the auto-routing rules and auto-routing constraints are extracted from the hierarchical layout database 508 for transfer to one of the auto-routing engine processing systems 516a, . . . , 516n. The selected auto-routing engine processing system 516a, . . . , 516n, then positions the metal wiring segments on the integrated circuit to form the integrated circuit's layout. The newly auto-routed layout database is then stored in the layout hierarchical database 508.

The newly auto-routed layout database is extracted from the layout hierarchical database 508 by one of the auto-routing analysis engine processing systems 520a, . . . , 520n. The auto-routing analysis engine processing systems 520a, . . . , 520n extracts the auto-routing rules, the auto-routing constraints, and the newly auto-routed layout. The auto-routing rules, the auto-routing constraints, and the newly auto-routed layout are analyzed to ensure that the resulting auto-routed layout is correct when compared to the netlist and that each of the wiring segments obeys the wiring rules. Further, the analysis verifies that the power dissipation, signal integrity, and noise generation meets the specifications. The analysis results are then transferred to the layout hierarchical database 508. The virtually copied layout database, newly auto-routed layout database, and the analysis of the newly auto-routed layout database are accessed from the layout hierarchical database 508 by one of the auto-routed data merge engine processing systems 522a, . . . , 522n. The one auto-routed data merge engine processing system 522a, . . . , 522n merges the newly auto-routed layout database and the newly auto-routed layout database analysis to the virtually copied layout database, which is then saved to the layout hierarchical database 508. The virtual database with the newly auto-routed layout is then retrieved from the layout hierarchical database 508 to be cleaned. The one auto-routed data merge engine processing system 522a, . . . , 522n cleans the virtual database with the newly auto-routed layout by deleting all temporary layout databases generated as part of the preparation for the auto-routing engine execution. The temporary layout databases are eliminated because the newly auto-routed layout database and the resultant analysis layout database have been saved on the hierarchical layout database.

Figure 15A:
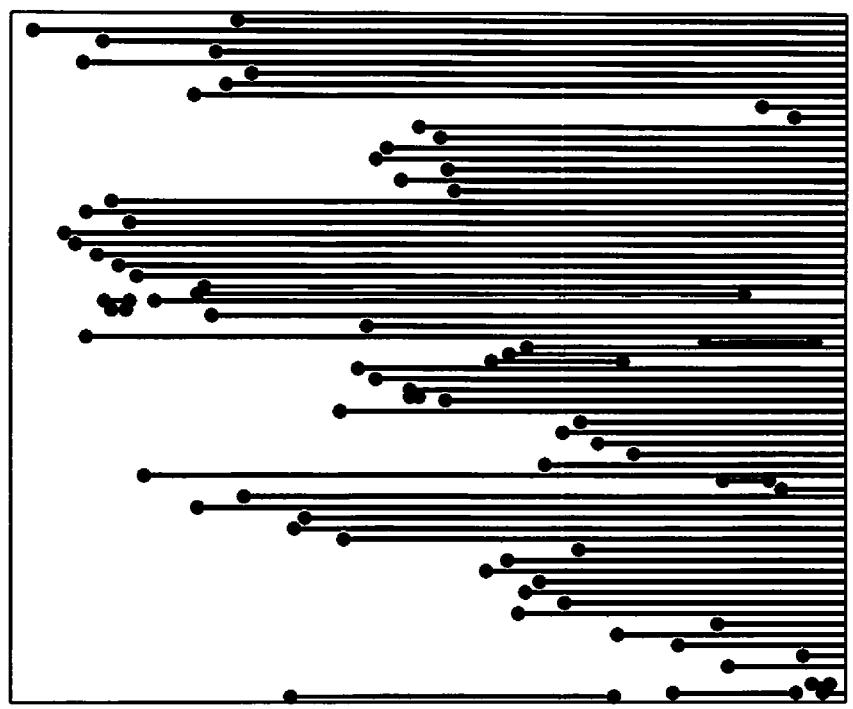
FIGS. 15A, 15B, and 15C are layout diagrams that provide examples of two wiring layers and a dielectric layer of an integrated circuit illustrating the wiring structure generated by the process of automated routing of metal wiring structures on an integrated circuit embodying the principles of the present disclosure.
Figure 15B:
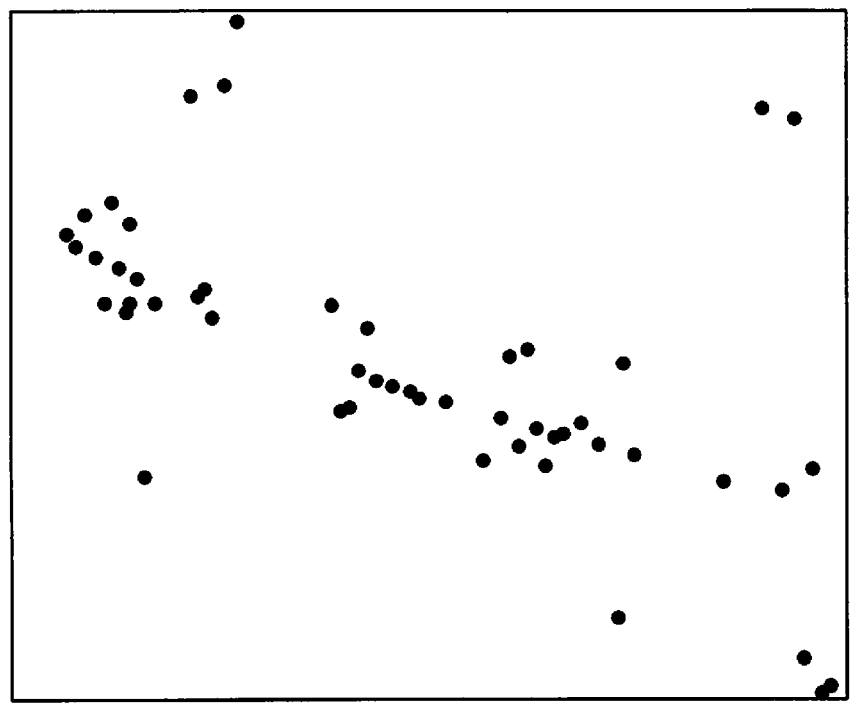
Figure 15C:
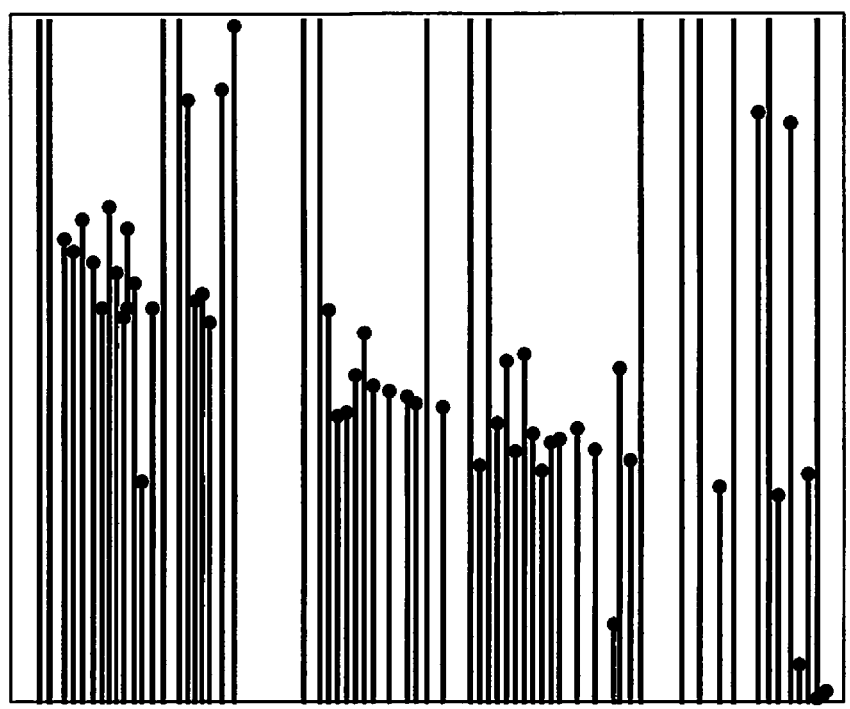

FIGS. 15A, 15B, and 15C are layout diagrams that provide examples of two wiring layers and a dielectric layer of an integrated circuit illustrating the wiring structure generated by the process of automated routing of metal wiring structures on an integrated circuit embodying the principles of the present disclosure. FIG. 15A illustrates a first metallization layer, FIG. 15B illustrates a dielectric layer, and FIG. 15C illustrates a second metallization layer. The wiring direction of the illustration FIG. 15A is horizontal from the edge of the illustration to points wherein wiring segments meet through-silicon vias (TSV). The illustration of FIG. 15B shows the TSV's in the dielectric layer. The wiring direction shown in the illustration of FIG. 15C is vertical. In this case, the wiring segments lead vertically from the bottom edge to the illustration to locations of the TSV's to be connected to the horizontal wiring segments shown in FIG. 15A. The metal layer orientation restriction is specified in the auto-routing constraint definition step (Box 414) of FIG. 5A. The TSV's of FIG. 15B are strategically placed to fulfill the specific routing and electrical constraints and not following a particular pattern.

Figure 2:
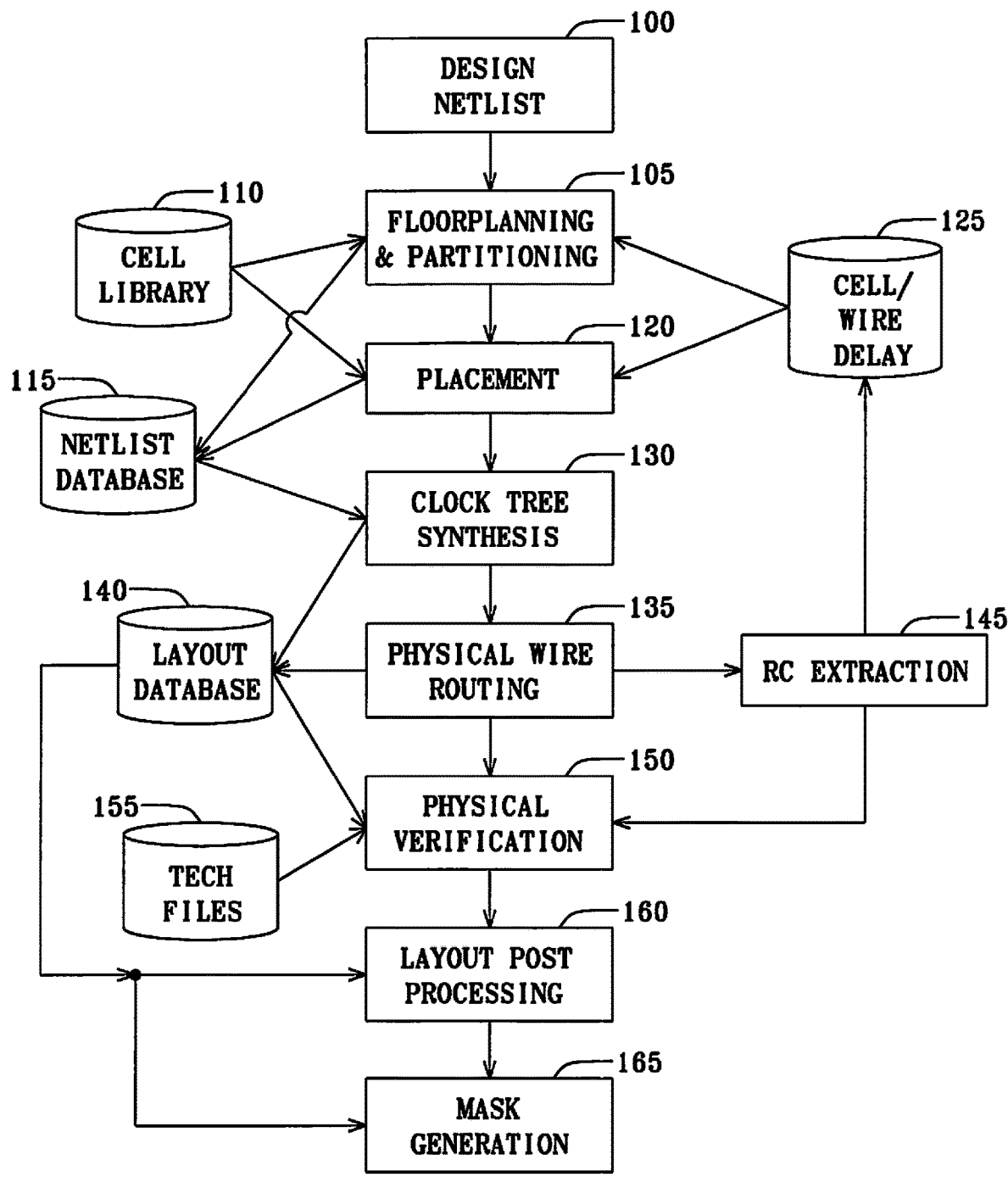
FIG. 2 is a flowchart of the physical design, verification, and premanufacturing processing of an integrated circuit of the prior art.
Figure 3A:
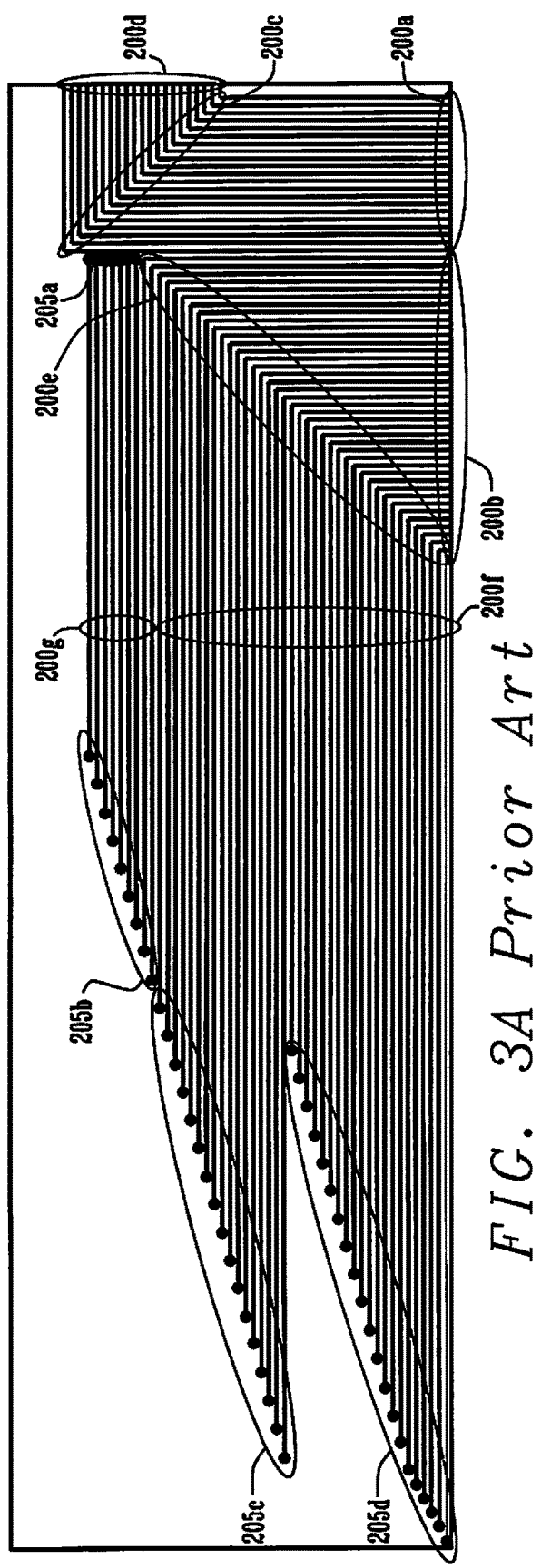
FIGS. 3A, 3B, and 3C are layout diagrams of two wiring layers and a dielectric layer of an integrated circuit illustrating the prior art's wiring structure.
Figure 3B:
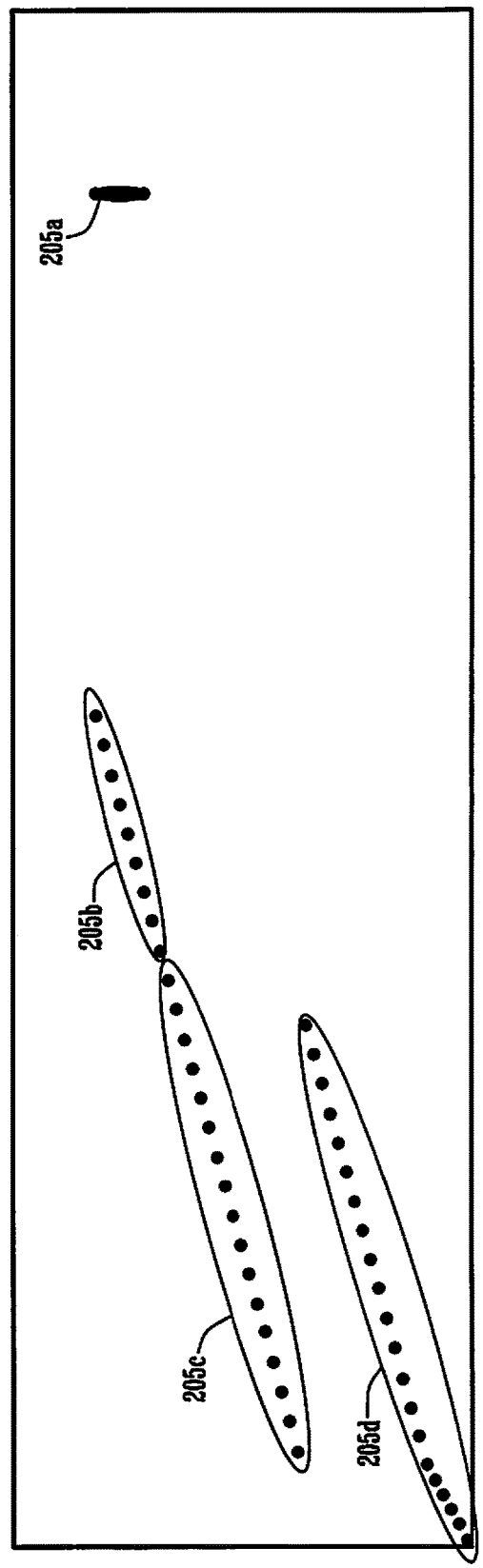
Figure 3C:
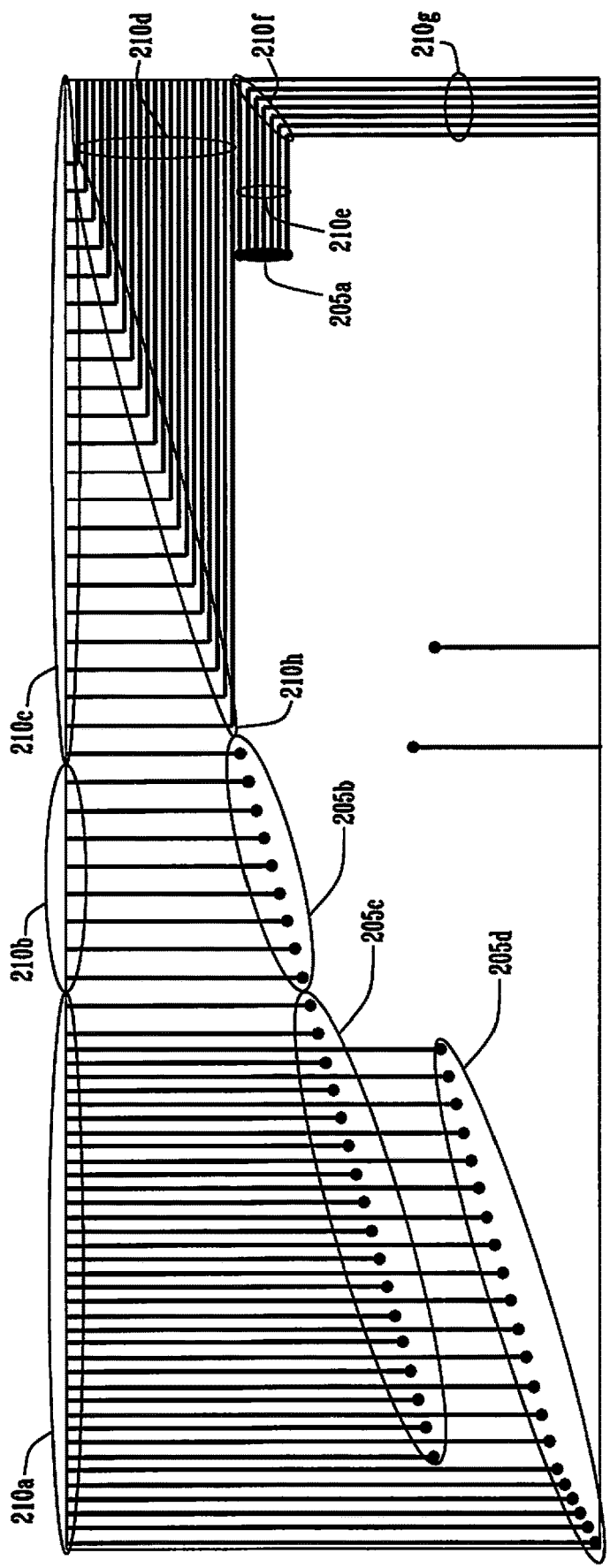

FIG. 16A is a diagram of two portions of an integrated circuit having large macro circuit designs and illustrating how the large macro 706 is divided to allow wiring of the integrated circuit of the prior art. FIGS. 16B and 16C are diagrams of an integrated circuit having large macro circuit 706 and illustrating how the hierarchy of the large macro circuit 706 is expanded into smaller macro circuits 706w, 706s, 706y, 706z, to allow the automated routing of metal wiring structures on the integrated circuit embodying the principles of the present disclosure. Referring to both FIGS. 16A and 16b, A substrate 700 is formed with the macro circuits 702, 704, 706, 708, 710. Global wiring channels 712, 714, 716, 718 are formed between the macro circuits 702, 704, 706, 708, 710 to allow routing of the global wiring between the macro circuits 702, 704, 706, 708, 710. For large macro circuits 706, the global wiring is obstructed from being routed between the macro circuits 702, 704, and the macro circuits 708, 710. To alleviate the blockages, the layout hierarchy is physically flattened, or a custom block abstract is created to protect the macro circuit 706. The sub-macro circuits 706w, 706x, 706y, 706z are formed, and the blockage routing exclusions are created for the sub-macro circuits 706w, 706x, 706y, 706z with a global wiring channel 620 allows connections between the macro circuits 702, 704, 708, 710. Forming the sub-macro circuits 706w, 706x, 706y, 706z increases the layout database 140 of FIG. 2 complexity and hierarchy nonconformity, as the layout block hierarchy must be changed. Consequently, the layout hierarchy is no longer matching the schematic anymore. This mismatch causes significant additional time to be spent in database preparation before and after the auto-routing routines.

Referring now to FIGS. 16B and 16C, the macro circuit 706 is structured initially, as shown in FIG. 16A. To preserve the hierarchy tree and achieve auto-route through the hierarchical macro circuit 706, new abstracts, and blockages for the macro circuit's 706 content. These new abstracts and blockages for the macro circuit's 706 content are accomplished by translating the sub-macros 706w, 706x, 706y, 706z to an abstract and blockage, preserving its location on the hierarchy tree (−1" level of FIG. 16C). Consequently, the macro circuit 706 will have its content hierarchical sub-macros 706w, 706x, 706y, 706z) updated with an abstract and blockage representation, allowing auto-route through it.

The translation of the sub-macros 706w, 706x, 706y, 706z allows controlled auto-routing through hierarchical macro circuits 706 by preserving layout correlation with the schematic tree hierarchy. This process applies to hierarchical macro circuits 706, which would have its abstract and blockage generation obstructing interconnections' natural course. Further, the hierarchy tree correlation is essential for the auto-routing workflow of FIG. 4. Nonconformities are avoided with the schematic database. If the schematic database is not preserved, there will be unbound instances and interconnections that will make it such that the layout database 428 of FIG. 5A does not represent the schematic database. The unbound instances and interconnections will make the auto-routing engine process (Box 434) of FIG. 5B prone to uncontrolled behavior.

Figure 16D:
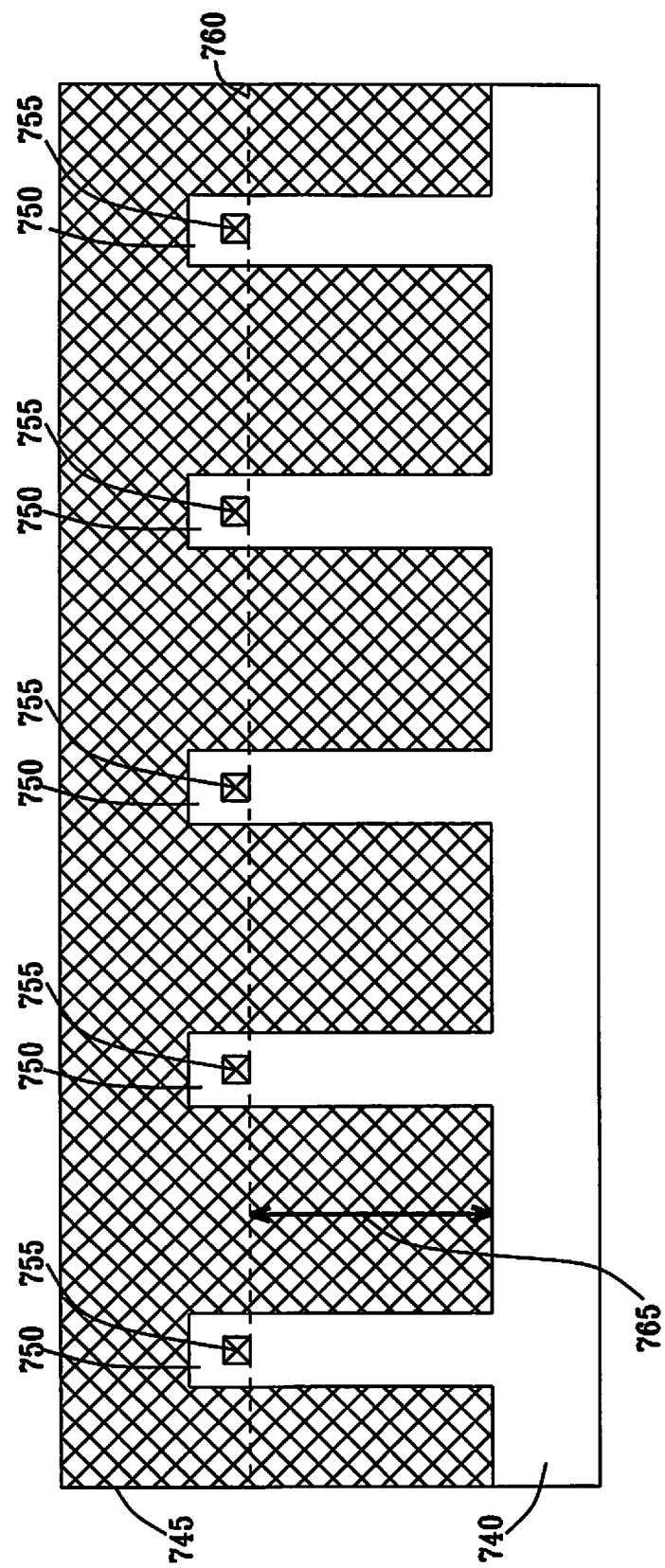
FIG. 16D is a diagram of a block within a macro circuit illustrating the defined block's boundary, pins (terminals) of the interconnection points, blockages generated to avoid routing through the block.

FIG. 16D is a diagram of a block within a macro circuit illustrating the defined block's boundary 740, pins (terminals) 755 of the interconnection points, blockages 745 generated to avoid routing through the block. The data of the macro circuit's 706 content contains the defined block's boundary 760, pins (terminals) 755, the interconnection points 755. The blockages 745 are generated to avoid routing through the blocks of the macro circuit 706. These blockages are processed if required for the identified blocks. Tweaks on the blockage 745 are generated to allow the auto-routing engine to reach the pins/terminals 755 for interconnection, thus mostly exposing the block's pins/terminals reaching points. The blockage generation is a very important item since the pins/terminals would be blocked by the blockage generated. Further modifications would be to provide an extension 765 of the blockage generation beyond the block's boundary 740 to avoid routing near the block's periphery 740, consequentially minimizing capacitive coupling between the auto-routed tracks and the block's internal structures.

While this disclosure has been particularly shown and described with reference to the preferred embodiments thereof, it will be understood by those skilled in the art that various changes in form and details may be made without departing from the spirit and scope of the disclosure.

What is claimed is:

1. A computer-implemented method for automating workflow for routing of metal wiring structures on an integrated circuit comprises the steps of:
    defining the options for the workflow;
    setting necessary variables;
    providing a layout database identification and locations;
    physically entering workflow options, essential variables, and the database identification and location to a networked computing system;
    acknowledging the input option, variables, identification, location, and option settings and accesses the layout database that is resident in one or more storage locations;
    making a virtual copy of the layout database to be auto-routed;
    preparing the layout database by editing the virtually copied layout database files to place the layout database files in condition for executing the auto-routing engine process;
    activating an auto-routing engine process for placing metal wiring segments for each wiring connection of the network of interconnections of the integrated circuit;
    activating the auto-routing engine process for determining the routing of the interconnection;
    activating the auto-routing engine for ensuring that each of the metal wiring segments obeys all the wiring design rules and constraints for the integrated circuit;
    performing an auto-routing or routing analysis for verifying that the routing of the wiring interconnections is logically equivalent to the original description of the design;
    merging the auto-routed database to the layout database resident in the storage system;
    saving the final layout to a project database stored in the storage system;
    cleaning the layout database to delete all temporary layout databases generated as part of the auto-routing engine execution preparation.

2. The method of claim 1, wherein the copied layout database contains the layout data block's floorplanning/placement, routing channel definitions, connectivity of interconnections to be auto-routed, and routing constraints to be fulfilled.

3. The method of claim 2, wherein the layout data is abstract generated.

4. The method of claim 1, wherein the metal wiring segments connect each macro circuit to form each interconnection.

5. The method of claim 1, wherein creating the wiring segment geometries comprises the steps of:
    assigning all the terminals to the set of wiring interconnections;

connecting the wiring segments; and
ensuring that no wiring segments are connected to wrong interconnections.

6. The method of claim 1, wherein performing an auto-routing or routing analysis comprises steps of:
   includes extracting resistance and capacitance of each of the interconnections of the integrated circuits;
   determining a timing performance of the integrated circuit from the resistance and capacitance; and
   evaluating the timing performance against the design timing calculations.

7. The method of claim 6, wherein performing an auto-routing or routing analysis comprises calculating a noise margin for determining a noise performance of the integrated circuits and establishing if there is excess noise on the integrated circuit.

8. The method of claim 1, wherein preparing the layout database by editing the virtually copied layout database comprises:
   providing a hierarchical macro circuit withing the layout database:
   preserving a hierarchy tree;
   achieving auto-route through a hierarchical macro circuit by the steps of:
      creating new abstracts and blockages for the macro circuit, translating sub-macros of the hierarchical macro circuit into an abstract and blockage for preserving its location on the hierarchy tree,
      arranging a space between the sub-macros of the hierarchical macro circuit, and
      updating the macro circuit with an abstract and blockage representation allows the auto-routing through the space between the macro circuit's sub-macro circuits.

9. A system comprising:
   at least one networked storage system configured for retaining integrated circuit design data;
   a plurality of networked computing systems in communication through the network to at least one storage system, the networked computing system comprising the steps of:
      at least one non-transitory computer-readable memory apparatus having stored contents including instructions,
      at least one processor connected to the at least one non-transitory computer-readable memory apparatus and configured for executing instructions for performing the method for automating workflow for routing of metal wiring structures on an integrated circuit of claim 1.

10. The system of claim 9, wherein the layout database comprises a netlist database, a layout constraints database, auto-routing wiring rules, and a final merge layout database.

11. The system of claim 9, wherein the copied layout database contains the layout data block's floorplanning/placement, routing channel definitions, connectivity of interconnections to be auto-routed, and routing constraints to be fulfilled.

12. The system of claim 11, wherein layout data is abstract generated.

13. The system of claim 9, wherein metal wiring segments connect each macro circuit to form each interconnection.

14. The system of claim 9, where creating the wiring segment geometries comprises the steps of:
   assigning all the terminals to the set of wiring interconnections;
   connecting the wiring segments; and
   ensuring that no wiring segments are connected to wrong interconnections.

15. The system of claim 9, wherein performing an auto-routing or routing analysis, comprises the steps of:
   includes extracting resistance and capacitance of each of the interconnections of the integrated circuits;
   determining a timing performance of the integrated circuit from the resistance and capacitance; and
   evaluating the timing performance against the design timing calculations.

16. The system of claim 15, wherein the performing an auto-routing or routing analysis comprises calculating a noise margin for determining a noise performance of the integrated circuits and establishing if there is excess noise on the integrated circuit.

17. The system of claim 9, wherein preparing the layout database by editing the virtually copied layout database comprises the steps of:
   providing a hierarchical macro circuit withing the layout database:
   preserving a hierarchy tree;
   achieving auto-route through a hierarchical macro circuit by the steps of:
      creating new abstracts and blockages for the macro circuit, translating sub-macros of the hierarchical macro circuit into an abstract and blockage for preserving its location on the hierarchy tree,
      arranging a space between the sub-macros of the hierarchical macro circuit, and
      updating the macro circuit with an abstract and blockage representation that allows the auto-routing through the space between the sub-macro circuits of the macro circuit.

18. A non-transitory computer-readable medium having stored contents including instructions that when executed on at least one computing system of a networked plurality of computing systems performs the method of claim 1.

19. The non-transitory computer-readable medium of claim 18, wherein the copied layout database contains the layout data block's floorplanning/placement, routing channel definitions, connectivity (interconnections to be auto-routed), and routing constraints to be fulfilled.

20. The non-transitory computer-readable medium of claim 19, wherein the layout data is abstract generated.

21. The non-transitory computer-readable medium of claim 18, wherein metal wiring segments connect each macro circuit to form each interconnection.

22. The non-transitory computer-readable medium of claim 21, wherein creating the wiring segment geometries comprises the steps of:
   assigning all the terminals to the set of wiring interconnections;
   connecting the wiring segments; and
   ensuring that no wiring segments are connected to wrong interconnections.

23. The non-transitory computer-readable medium of claim 18, wherein performing an auto-routing or routing analysis comprises the steps of:
   includes extracting resistance and capacitance of each of the interconnections of the integrated circuits;
   determining a timing performance of the integrated circuit from the resistance and capacitance; and
   evaluating the timing performance against the design timing calculations.

24. The non-transitory computer-readable medium of claim 23, wherein performing an auto-routing or routing analysis comprises calculating a noise margin for determining a noise performance of the integrated circuits and establishing if there is excess noise on the integrated circuit.

25. The non-transitory computer-readable medium of claim 18, wherein preparing the layout database by editing the virtually copied layout database comprises the steps of:
- providing a hierarchical macro circuit withing the layout database:
- preserving a hierarchy tree;
- achieving auto-route through a hierarchical macro circuit by the steps of:
  - creating new abstracts and blockages for the macro circuit, translating sub-macros of the hierarchical macro circuit into an abstract and blockage for preserving its location on the hierarchy tree,
  - arranging a space between the sub-macros of the hierarchical macro circuit, and
  - updating the macro circuit with an abstract and blockage representation that allows the auto-routing through the space between the sub-macro circuits of the macro circuit.

\* \* \* \* \*